(12) United States Patent
Kashiwa

(10) Patent No.: US 11,603,904 B2
(45) Date of Patent: Mar. 14, 2023

(54) ENGINE DEVICE

(71) Applicant: Yanmar Power Technology Co., Ltd., Osaka (JP)

(72) Inventor: Koki Kashiwa, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 86 days.

(21) Appl. No.: 17/117,074

(22) Filed: Dec. 9, 2020

(65) Prior Publication Data

US 2021/0164538 A1     Jun. 3, 2021

Related U.S. Application Data

(63) Continuation of application No. 16/089,205, filed as application No. PCT/JP2017/010038 on Mar. 13, 2017, now Pat. No. 10,890,231.

(30) Foreign Application Priority Data

Mar. 29, 2016   (JP) .................. 2016-066825

(51) Int. Cl.
| *F02B 77/00* | (2006.01) |
| *F02F 7/00* | (2006.01) |
| *F16F 15/315* | (2006.01) |
| *F02M 37/06* | (2006.01) |
| *F16C 3/06* | (2006.01) |

(52) U.S. Cl.
CPC .......... *F16F 15/3153* (2013.01); *F02B 77/00* (2013.01); *F02F 7/0043* (2013.01); *F02F 7/0073* (2013.01); *F02M 37/06* (2013.01); *F16C 3/06* (2013.01)

(58) Field of Classification Search
CPC ..... F16F 15/3153; F02B 77/00; F02F 7/0043; F02F 7/0046; F02F 7/0082; F02F 7/0073; F02F 2007/0075; F02F 2007/0078; F02M 37/06; F16C 3/06
See application file for complete search history.

(56) References Cited

U.S. PATENT DOCUMENTS

| 2004/0159303 | A1* | 8/2004 | Aketa | ............... | F02B 69/00 |
| | | | | | 123/195 R |
| 2012/0260891 | A1* | 10/2012 | Love | ............. | F02M 63/0001 |
| | | | | | 123/495 |
| 2014/0332306 | A1* | 11/2014 | Fuqua | ............ | F01B 7/14 |
| | | | | | 180/291 |
| 2018/0216522 | A1* | 8/2018 | Hittie | .............. | F01L 1/026 |

\* cited by examiner

*Primary Examiner* — Jacob M Amick

(74) *Attorney, Agent, or Firm* — Chris Mizumoto

(57) ABSTRACT

An engine device having a flywheel housing in which a flywheel that is rotated integrally with a crankshaft is accommodated on one side portion of a cylinder block, in which the cylinder block is integrally formed with housing bracket portions each protruding in a direction away from the crankshaft from each of opposite side portions of the cylinder block extending along a crankshaft axial direction, the housing bracket portions protruding from end portions of the opposite side portions close to the one side portion, and a space surrounded by the one side portion, the housing bracket portions, and the flywheel housing constitutes a gear case for accommodating therein a gear train.

6 Claims, 22 Drawing Sheets

ENGINE DEVICE

CROSS REFERENCE

This is a continuation of U.S. application Ser. No. 16/089,205 filed Sep. 27, 2018, which is a US national stage application under 35 U.S.C. § 371 of International Application No. PCT/JP2017/010038, filed Mar. 13, 2017, which claims foreign priority of Japanese Patent Application No. 2016-066825 filed Mar. 29, 2016, all the disclosures of which are hereby incorporated by reference in their entirety.

TECHNICAL FIELD

The present invention relates to an engine device, and in particular, relates to an engine device having a flywheel housing in which a flywheel that is rotated integrally with a crankshaft is accommodated on one side portion of a cylinder block.

BACKGROUND ART

An engine device in which a flywheel that is rotated integrally with a crankshaft is disposed on one side of a cylinder block is well known (see, for example, Patent Literature 1 (PTL 1)). On one side of the cylinder block, a flywheel housing accommodating the flywheel is arranged. Further, on the other end of the cylinder block facing the one end, a gear case accommodating therein a timing gear train including a crank gear, an idling gear, a camshaft gear, a fuel feed pump gear, and the like is arranged.

CITATION LIST

Patent Literature

PTL 1: Japanese Patent Application Laid-Open No. 2012-189027
PTL 2: Japanese Patent Application Laid-Open No. 2010-261322

SUMMARY OF INVENTION

Technical Problem

In a structure where a flywheel and a gear train are arranged so as to interpose therebetween a cylinder block, there is a problem of twist taking place in the crankshaft, because a position where the flywheel with a great moment of inertia is fixed is distanced from a position where a crank gear for rotating the gear train which drives a valve gear, auxiliary machine, and the like, is fixed. The twist in the crankshaft is one of causes that increases torsional vibration of the crankshaft, which leads to an increase in the engine noise level.

In view of the problem, an object of the present invention is to reduce the twist in—the crankshaft.

Solution to Problem

An engine device according to an aspect of the present invention is an engine device having a flywheel housing in which a flywheel that is rotated integrally with a crankshaft is accommodated on one side portion of a cylinder block, in which the cylinder block is integrally formed with housing bracket portions each protruding in a direction away from the crankshaft from each of opposite side portions of the cylinder block extending along a crankshaft axial direction, the housing bracket portions protruding from end portions of the opposite side portions close to the one side portion, and a space surrounded by the one side portion, the housing bracket portions, and the flywheel housing constitutes a gear case for accommodating therein a gear train.

The engine device of the above aspect of the present invention may be such that, for example, a weight-reduction space continuous to the gear case is formed between a cylindrical circumferential wall surface portion surrounding an outer circumference side of the flywheel and an outer wall portion covering the outer circumference side of the circumferential wall surface portion, and a rib coupling the circumferential wall surface portion with the outer wall portion is formed, in the flywheel housing.

Further, the circumferential wall surface portion may be in a shape of a substantially truncated cone with its radius decreasing towards the cylinder block, and a surface of the rib on a side of a cylinder head coupling surface of the cylinder block may be formed to incline so as to be in a position closer to the cylinder head coupling surface with an increase in the distance from the cylinder block.

Further, the engine device of the above aspect of the present invention may be such that, for example, the gear train includes: a crank gear fixed to the crankshaft; an idling gear meshed with the crank gear; a cam gear fixed to a camshaft and meshed with the idling gear; and a pump gear fixed to a pump shaft of a fuel feed pump and meshed with the idling gear, the flywheel housing has an attaching part for a crank rotation angle detector configured to detect a rotation angle of the crankshaft and an attaching part for a rotation shaft rotation angle detector configured to detect a rotation angle of the cam gear or the pump gear.

Further, for example, a lubricating oil supply port penetratingly opened in the flywheel housing may be configured so that a meshing position of the fuel feed pump gear and the idling gear is visually observable.

Further, for example, the lubricating oil supply port may be such that an opening area of an internal side of the flywheel housing is greater than an opening area of an external side of the flywheel housing.

Advantageous Effects of Invention

In the engine device of the above aspect of the present invention, housing bracket portions each protruding in a direction away from the crankshaft are integrally formed with the cylinder block at end portions on the flywheel-arranged side of opposite side portions of the cylinder block along the crankshaft axial direction, and a space surrounded by the one side portion, the housing bracket portions, and the flywheel housing constitutes a gear case for accommodating therein a gear train. Thus, the flywheel and the gear train can be arranged on the same end portion of the crankshaft. Twist of the crankshaft can be reduced by solving the twist of crankshaft caused by the structure having the flywheel and the gear train arranged across from each other over the cylinder block. Further, torsional vibration of the crankshaft which causes vibration and noise of the gear train is smaller in a portion of the crankshaft closer to the flywheel with a large moment of inertia as compared to a portion of the crankshaft far from the flywheel. Thus, by arranging the flywheel and the gear train on the same end portion of the crankshaft, vibration and noise of the gear train can be reduced. Further, by forming the gear case with the cylinder block and the flywheel housing, the number of parts can be reduced as compared to a case of using a separate part for the gear case. Hence, reduction of the manufacturing costs and assembling processes can be achieved.

In the engine device of the above aspect of the present invention, a weight-reduction space continuous to the gear case is formed between a cylindrical circumferential wall surface portion surrounding an outer circumference side of the flywheel and an outer wall portion covering the outer circumference side of the circumferential wall surface portion, and a rib coupling the circumferential wall surface portion with the outer wall portion is formed, inside the flywheel housing. This way, strength can be achieved by the rib, while the weight of the flywheel housing can be reduced by the weight-reduction space. Thus, problems such as an increase in weight, manufacturing defects during casting, cracks due to concentration of stress taking place when the thickness of a wall is increased to achieve the strength of the flywheel housing can be avoided.

Further, by forming the circumferential wall surface portion in a shape of a substantially truncated cone with its radius decreasing towards the cylinder block, and by forming a surface of the rib on a side of a cylinder head coupling surface of the cylinder block to incline so as to be in a position closer to the cylinder head coupling surface with an increase in the distance from the cylinder block, accumulation of lubricating oil in the flywheel housing can be prevented, and an accurate amount of lubricating oil in the engine can be observed.

Further, in the engine device of the above aspect of the present invention, the gear train includes: a crank gear fixed to the crankshaft; an idling gear meshed with the crank gear; a cam gear fixed to a camshaft and meshed with the idling gear; and a pump gear fixed to a pump shaft of a fuel feed pump and meshed with the idling gear, the flywheel housing has an attaching part for a crank rotation angle detector configured to detect a rotation angle of the crankshaft and an attaching part for a rotation shaft rotation angle detector configured to detect a rotation angle of the cam gear or the pump gear. With this, two rotation angle detectors can be attached to a single part, that is, the flywheel housing. Therefore, an attachment error caused by unevenness in the manufacturing accuracy and the assembling accuracy, which takes place at a time of attaching the two rotation angle detectors to separate parts, can be eliminated.

Further, by configuring a lubricating oil supply port penetratingly opened in the flywheel housing so that a meshing position of the fuel feed pump gear and the idling gear is visually observable, the timing marks on the fuel feed pump gear and the idling gear to be adjusted with the phase of the crankshaft can be observed through the lubricating oil supply port. With this, the fuel feed pump can be replaced, adjusting the timing marks, without detaching the flywheel and the flywheel housing which are very heavy parts. The number of parts to be replaced and the number of processes for attaching and detaching the engine device can be reduced, and the service performance can be significantly improved. Further, since the flywheel which is a rotating member does not have to be detached, the product safety after the maintenance can be improved. Further, since an audit window exclusively for mark adjustment does not have to be provided in the flywheel housing, an opening portion area of the flywheel housing including the gear case can be reduced. Therefore, gear noise leaking to the outside the engine can be suppressed.

Further, by forming the lubricating oil supply port such that an opening area of an internal side of the flywheel housing is greater than an opening area of an external side of the flywheel housing, the field of view for visually observing the inside of the gear case through the lubricating oil supply port can be broadened, thus improving the convenience in the work of adjusting the mark at the time of replacing the fuel feed pump. Further, with the opening area of the internal side being greater than the opening area of the external side, spilling of lubricating oil at a time of supplying the lubricating oil through the lubricating oil supply port can be prevented.

DESCRIPTION OF EMBODIMENTS

Figure 1:
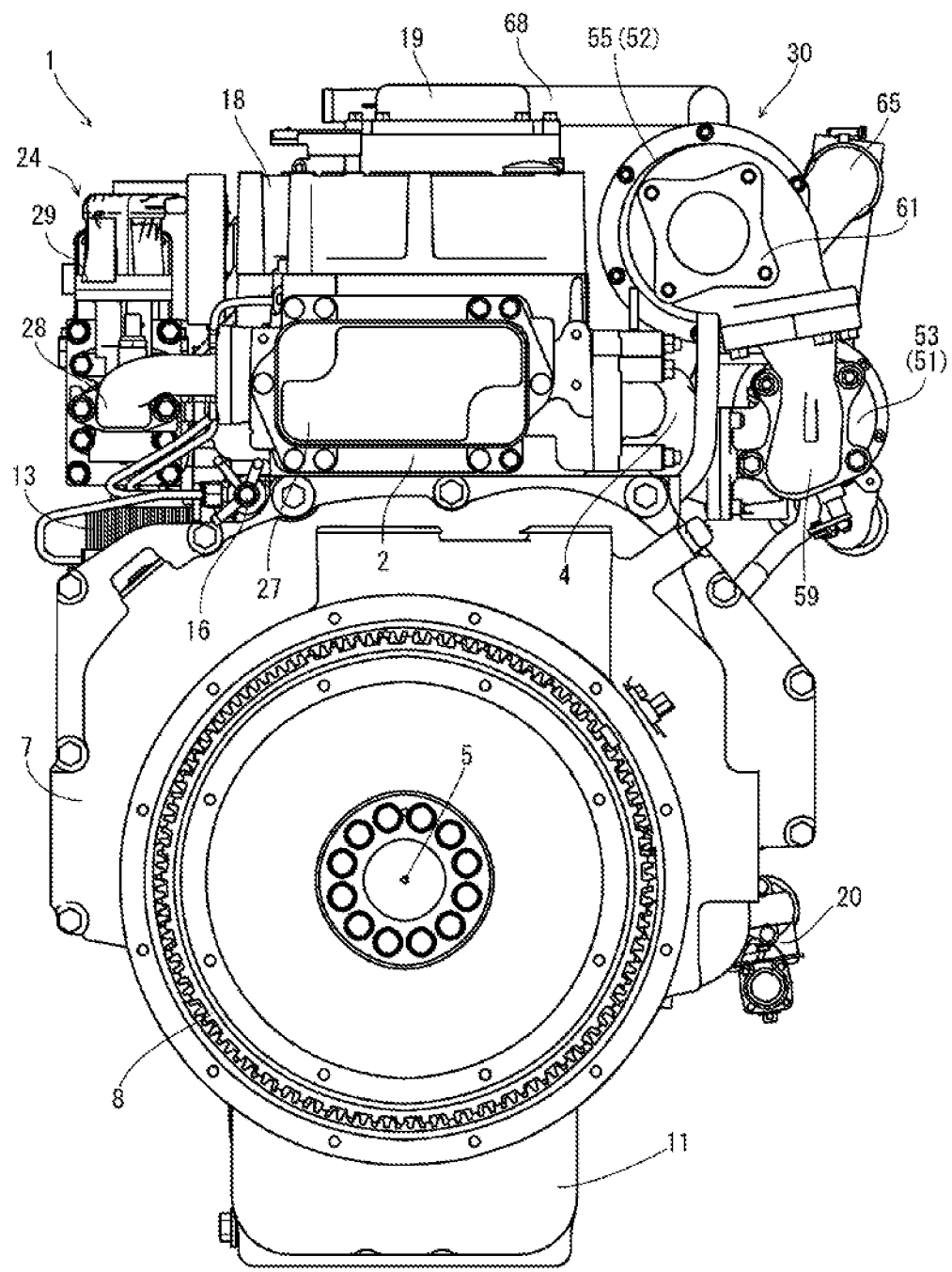
FIG. 1 A front view of an engine.

In the following, an embodiment of the present invention will be described with reference to the drawings. First, referring to FIG. 1 to FIG. 8, an overall structure of a diesel engine (engine device) 1 will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the diesel engine 1.

As shown in FIG. 1 to FIG. 8, an intake manifold 3 and an exhaust manifold 4 are disposed in one side portion and the other side portion of the diesel engine 1 parallel to the crankshaft 5. In the embodiment, the intake manifold 3 provided on a right surface of a cylinder head 2 is formed integrally with the cylinder head 2. The exhaust manifold 4 is provided on a left surface of the cylinder head 2. The cylinder head 2 is mounted on a cylinder block 6 in which the crankshaft 5 and a piston (not shown) are disposed. The cylinder block 6 pivotally supports the crankshaft 5 such that the crankshaft 5 is rotatable.

The crankshaft 5 has its front and rear distal ends protruding from front and rear surfaces of the cylinder block 6. The flywheel housing 7 is fixed to one side portion of the diesel engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the diesel engine 1 is extracted to an actuating part of a work machine (for example, a hydraulic shovel, a forklift, or the like) through the flywheel 8. The cooling fan 9 is disposed in the other side portion of the diesel engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump 12 (see FIG. 11) disposed on the right surface side of the cylinder block 6, the oil pump 12 being arranged in a coupling portion where the cylinder block 6 is coupled to the flywheel housing 7. The lubricant is then supplied to lubrication parts of the diesel engine 1 through an oil cooler 13 and an oil filter 14 that are disposed on the right surface of the cylinder block 6. The lubricant supplied to the lubrication parts is then returned to the oil pan 11. The oil pump 12 is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the intake manifold 3 of the cylinder head 2. The common rail 16 is disposed above the fuel feed pump 15. Injectors (not shown) for four cylinders are provided on an upper surface of the cylinder head 2 which is covered with a head cover 18. Each of the injectors has a fuel injection valve of electromagnetic-controlled type.

Each of the injectors is connected to a fuel tank (not shown) through the fuel feed pump 15 and the common rail 16 having a cylindrical shape. The fuel tank is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves of the injectors, the high-pressure fuel in the common rail 16 is injected from the injectors to the respective cylinders of the diesel engine 1.

A blow-by gas recirculation device 19 is provided on an upper surface of the head cover 18 covering intake and exhaust valves (not shown), etc. disposed on the upper surface of the cylinder head 2. The blow-by gas recirculation device 19 takes in a blow-by gas that has leaked out of a combustion chamber of the diesel engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the intake manifold 3 via the two-stage turbocharger 30.

An engine starting starter 20 is attached to the flywheel housing 7. The starter 20 is disposed below the exhaust manifold 4. A position where the starter 20 is attached to the flywheel housing 7 is below a coupling portion where the cylinder block 6 is coupled to the flywheel housing 7.

A coolant pump 21 for circulating a coolant is provided in a portion of the rear surface of the cylinder block 6, the portion being a little left-hand. Rotation of the crankshaft 5 causes the coolant pump 21 as well as the cooling fan 9 to be driven through the cooling fan driving V-belt 10. Driving the coolant pump 21 causes a coolant in a radiator (not shown) mounted in the work vehicle to be supplied to the coolant pump 21. The coolant is then supplied to the cylinder head 2 and the cylinder block 6, to cool the diesel engine 1.

A coolant inlet pipe 22 disposed below the exhaust manifold 4 is provided on the left surface of the cylinder block 6 and is fixed at a height equal to the height of the coolant pump 21. The coolant inlet pipe 22 is in communication with a coolant outlet of the radiator. A coolant outlet pipe 23 that is in communication with a coolant inlet of the radiator is fixed to a rear portion of the cylinder head 2. The cylinder head 2 has a coolant drainage 35 that protrudes rearward from the intake manifold 3. The coolant outlet pipe 23 is provided on an upper surface of the coolant drainage 35.

The inlet side of the intake manifold 3 is coupled to an air cleaner (not shown) via a collector 25 of an EGR device 24 (exhaust-gas recirculation device) which will be described later. Fresh air (outside air) suctioned by the air cleaner is subjected to dust removal and purification in the air cleaner, then fed to the intake manifold 3 through the collector 25, and then supplied to the respective cylinders of the diesel engine 1. In the embodiment, the collector 25 of the EGR device 24 is coupled to the right side of the intake manifold 3 which is formed integrally with the cylinder head 2 to form the right surface of the cylinder head 2. That is, an outlet opening of the collector 25 of the EGR device 24 is coupled to an inlet opening of the intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the diesel engine 1 (an EGR gas from the exhaust manifold 4) with fresh air (outside air from the air cleaner), and supplies a mixed gas to the intake manifold 3; an intake throttle member 26 that communicates the collector 25 with the air cleaner; a recirculation exhaust gas tube 28 that constitutes a part of a recirculation flow pipe passage connected to the exhaust manifold 4 via an EGR cooler 27; and an EGR valve member 29 that communicates the collector 25 with the recirculation exhaust gas tube 28.

The EGR device 24 is disposed on the right lateral side of the intake manifold 3 in the cylinder head 2. The EGR device 24 is fixed to the right surface of the cylinder head 2, and is in communication with the intake manifold 3 in the cylinder head 2. In the EGR device 24, the collector 25 is coupled to the intake manifold 3 on the right surface of the cylinder head 2, and an EGR gas inlet of the recirculation exhaust gas tube 28 is coupled and fixed to a front portion of the intake manifold 3 on the right surface of the cylinder head 2. The EGR valve member 29 and the intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The coolant and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe (not shown).

The high-pressure turbocharger 51 is coupled to the exhaust gas outlet 58 of the exhaust manifold 4, and is fixed to the left lateral side of the exhaust manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust manifold 4. Thus, the exhaust manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust manifold 4. That is, the exhaust manifold 4 and the two-stage turbocharger 30 are arranged so as to form a rectangular shape in a rear view (or front view), and are compactly fixed to the left surface of the cylinder head 2.

Next, referring to FIG. 9 to FIG. 13, a configuration of the cylinder block 6 will be described. The cylinder block 6 is provided with a left housing bracket portion 304 and a right housing bracket portion 305 (protruding portions) that are disposed in end portions of a left surface 301 and a right surface 302 of the cylinder block 6, the end portions being on the front surface 303 side and extending in a direction along a crankshaft center 300. The flywheel housing 7 is fixed to the left housing bracket portion 304 and the right housing bracket portion 305 with a plurality of bolts. A left-side first reinforcing rib 306, a left-side second reinforcing rib 307, a left-side third reinforcing rib 308, and a left-side fourth reinforcing rib 309, which are arranged in this order from up to down (from the top deck side to the oil pan rail side), are provided between the left housing bracket portion 304 and a side wall of the left surface 301. A right-side first reinforcing rib 310 and a right-side second reinforcing rib 311, which are arranged in this order from up to down, are disposed between the right housing bracket portion 305 and the side wall of the right surface 302. The housing bracket portions 304, 305 and the reinforcing ribs 306 to 311 are formed integrally with the cylinder block 6.

Each of the reinforcing ribs 306 to 311 extends in the direction along the crankshaft center 300. In a plan view, each of the housing bracket portions 304, 305 has a substantially wide triangular shape. The left-side reinforcing ribs 307, 308, 309 and the right-side second reinforcing rib 311 have linear portions 307 a, 308 a, 309 a, 311 a that extend from the substantially triangular portions toward a rear surface 312 of the cylinder block 6 (see FIG. 7 and FIG. 8, too). The reinforcing ribs 306, 307, 308 are disposed in a cylinder portion of the cylinder block 6. The reinforcing ribs 309, 310, 311 are disposed in a skirt portion of the cylinder block 6.

Figure 2:
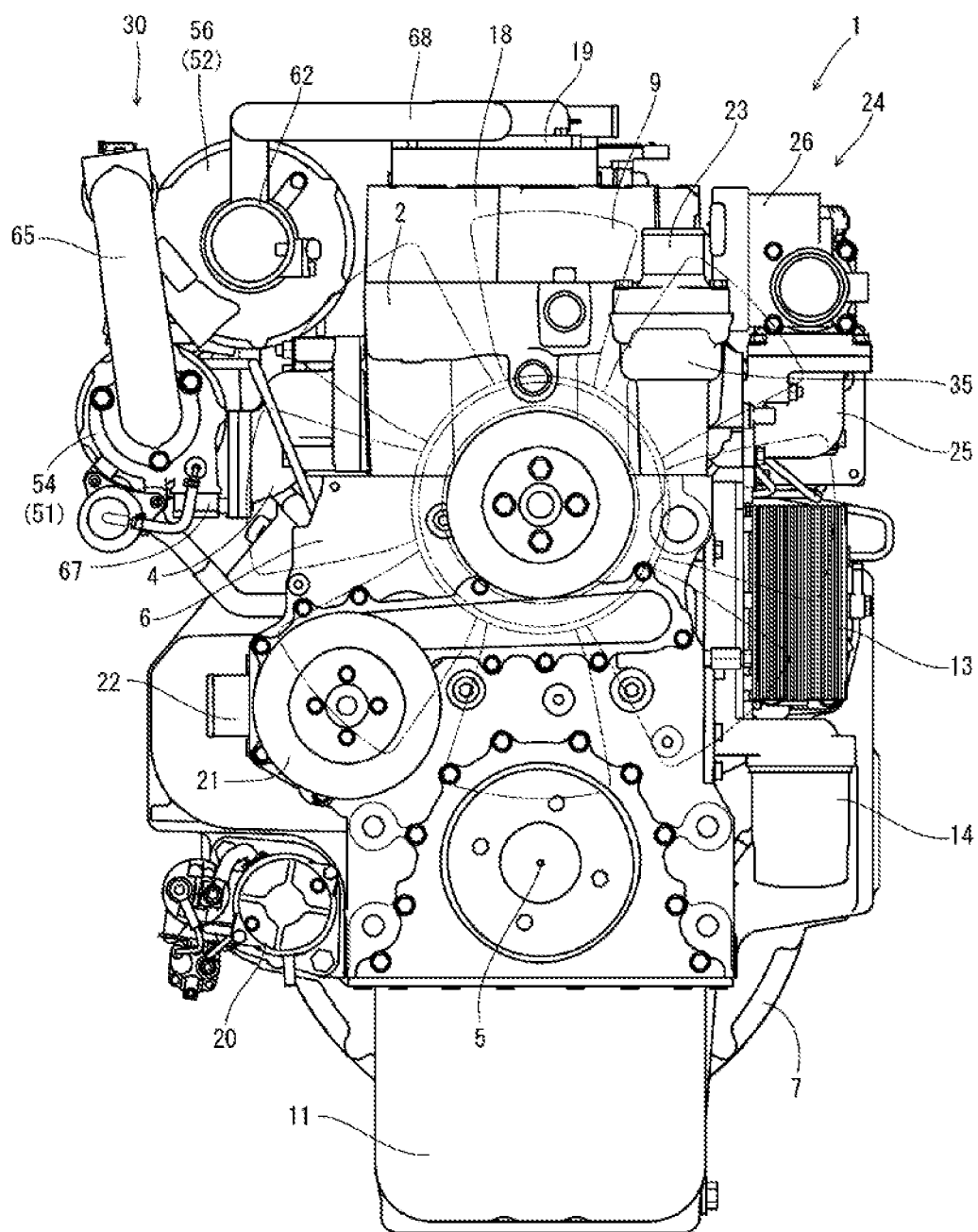
FIG. 2 A rear view of the engine.
Figure 3:
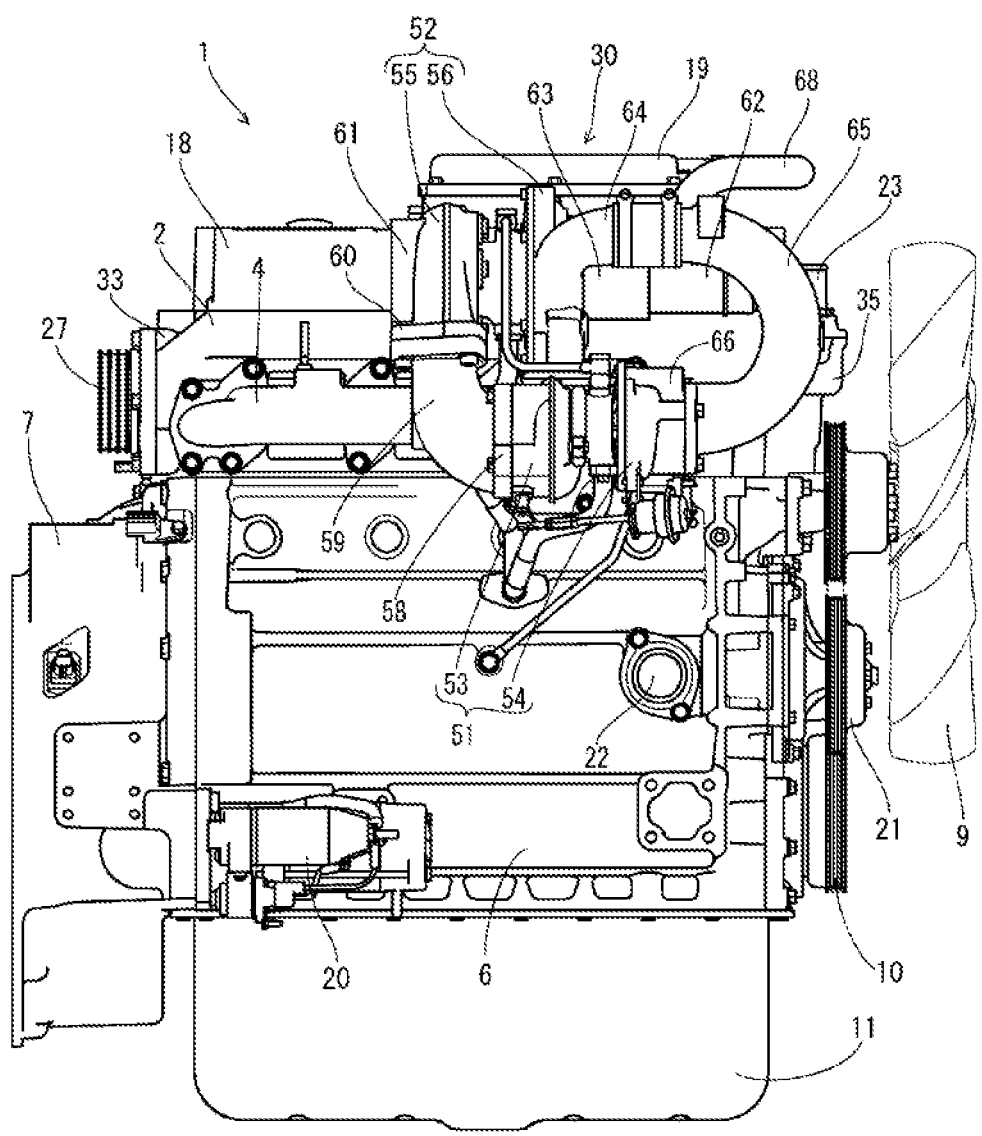
FIG. 3 A left side view of the engine.
Figure 4:
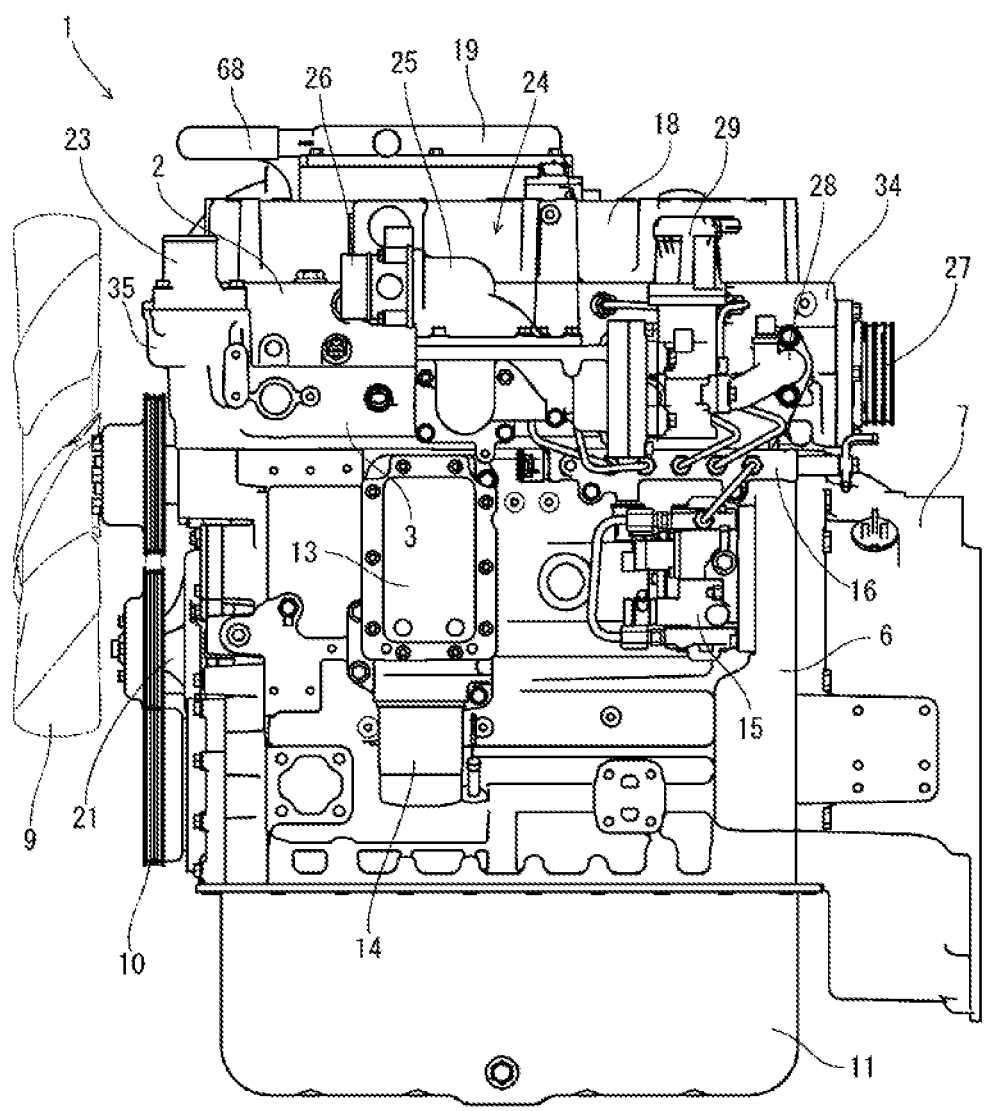
FIG. 4 A right side view of the engine.
Figure 5:
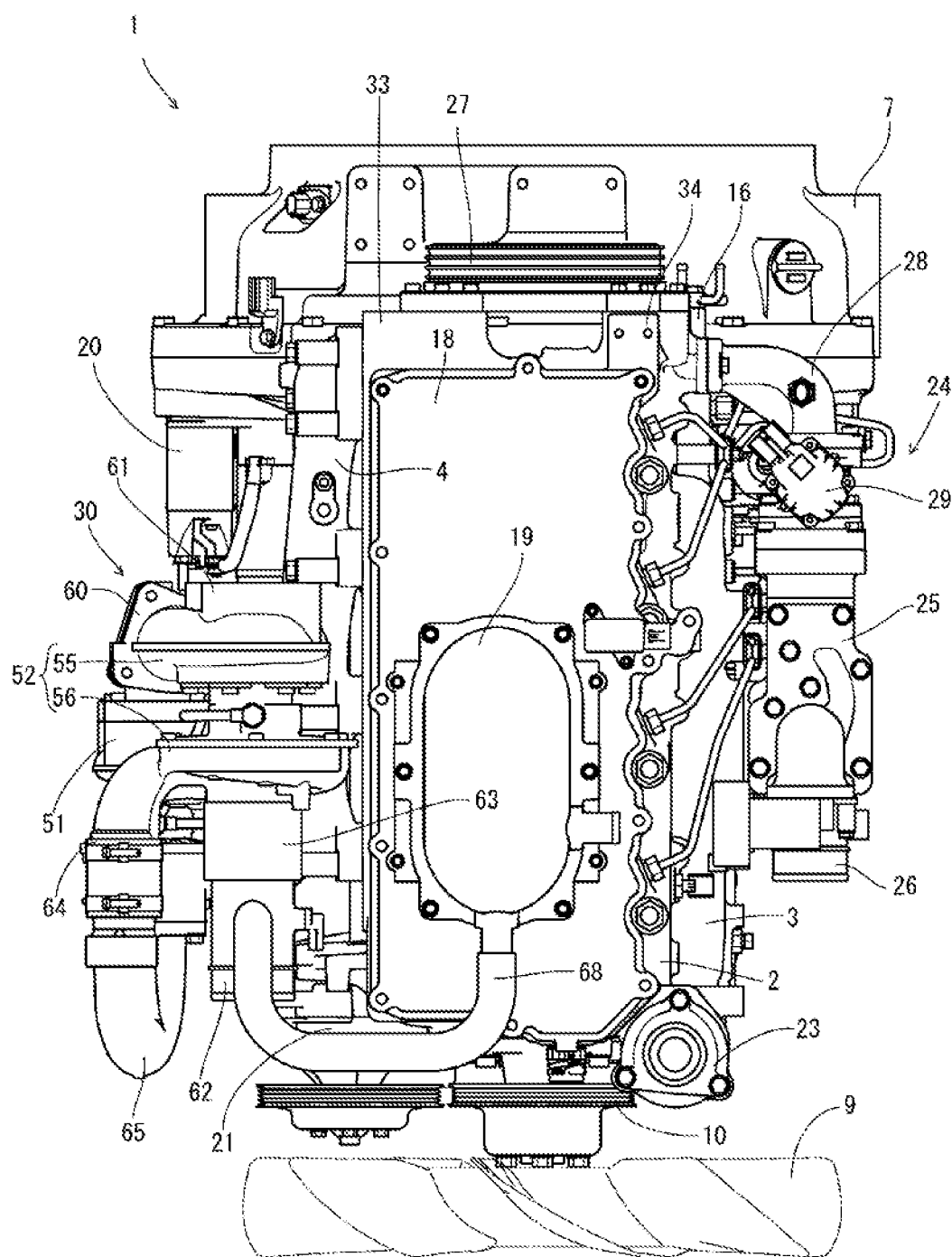
FIG. 5 A top plan view of the engine.
Figure 6:
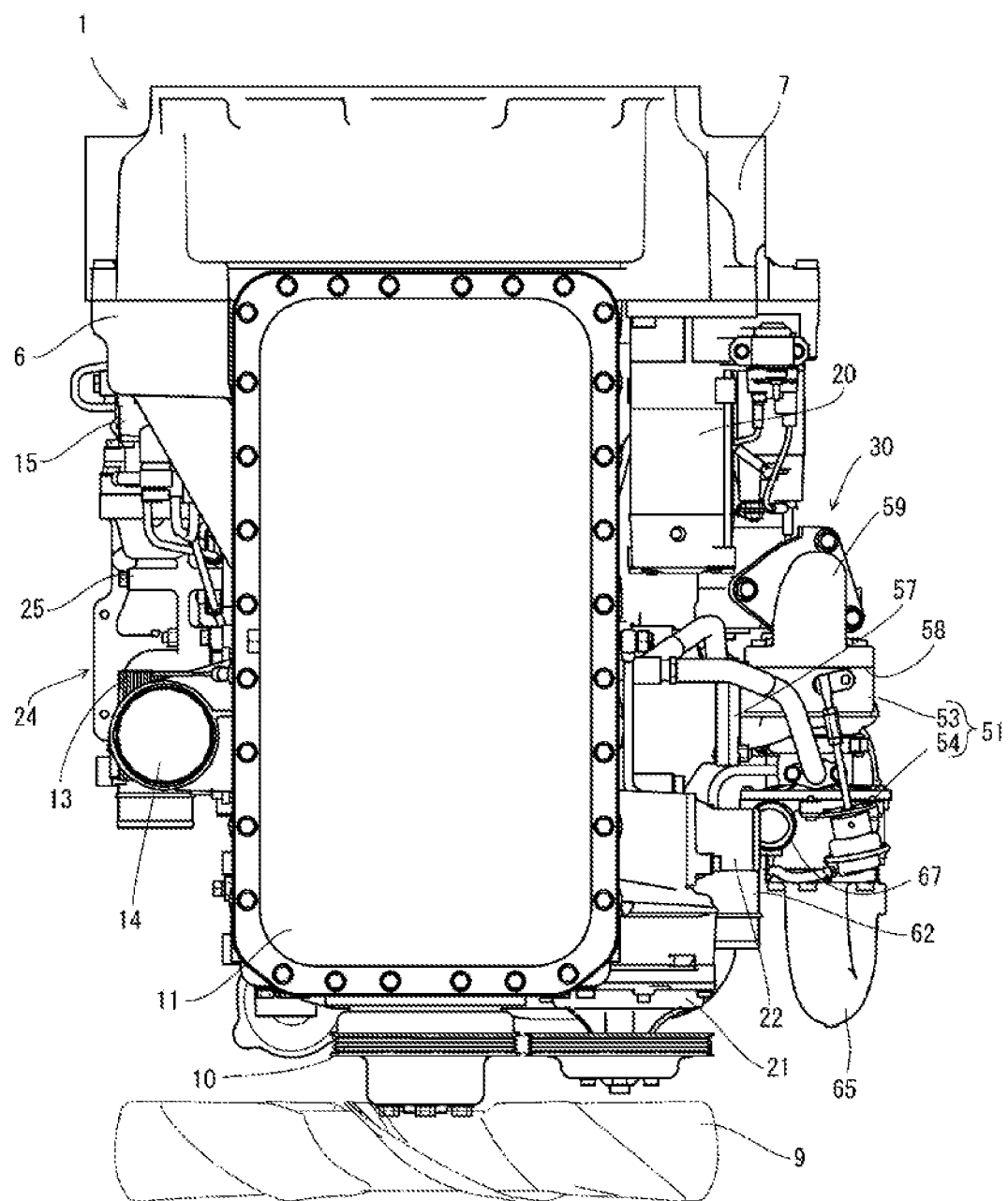
FIG. 6 A bottom plan view of the engine.
Figure 7:
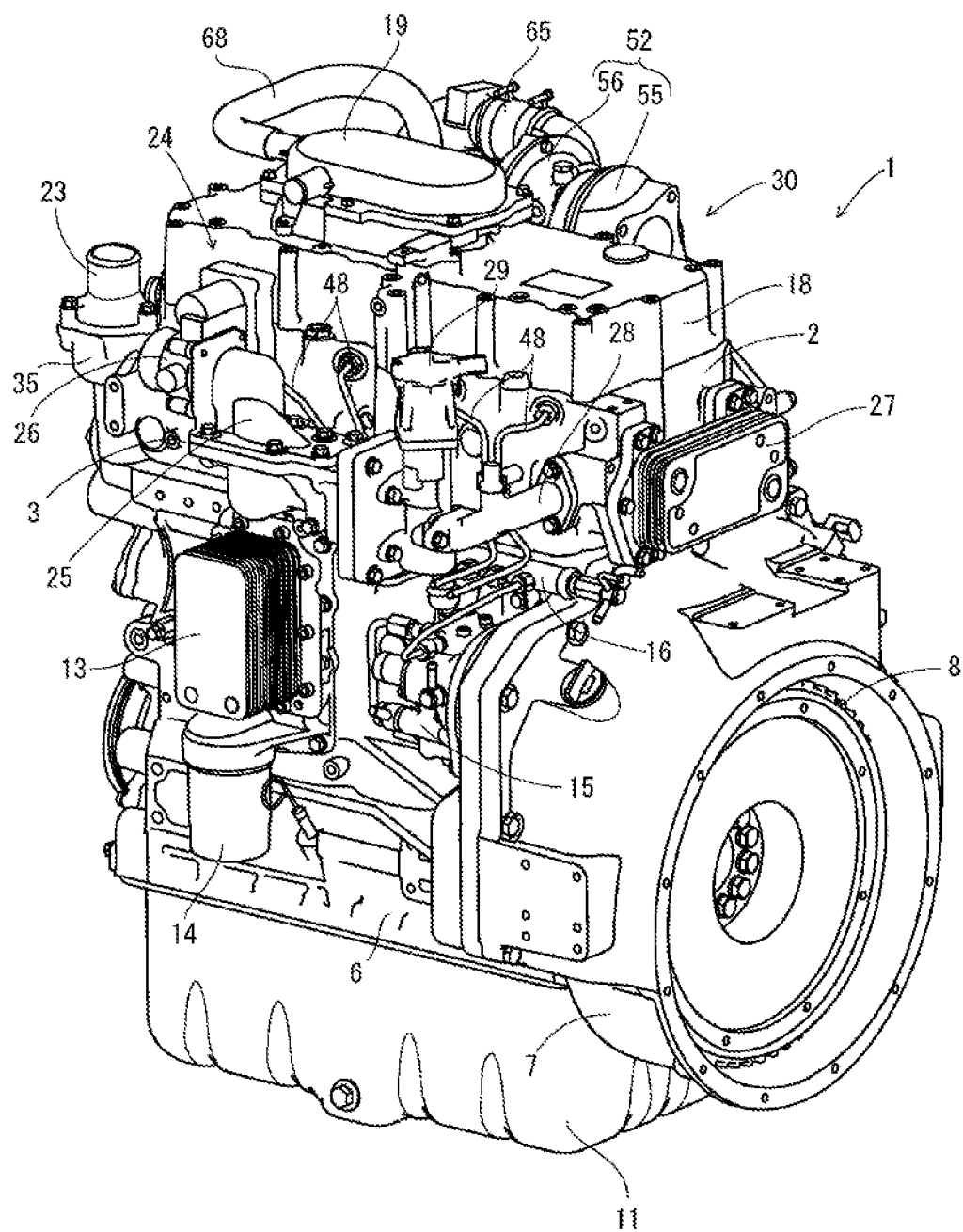
FIG. 7 A perspective view of the engine as viewed from diagonally front.
Figure 8:
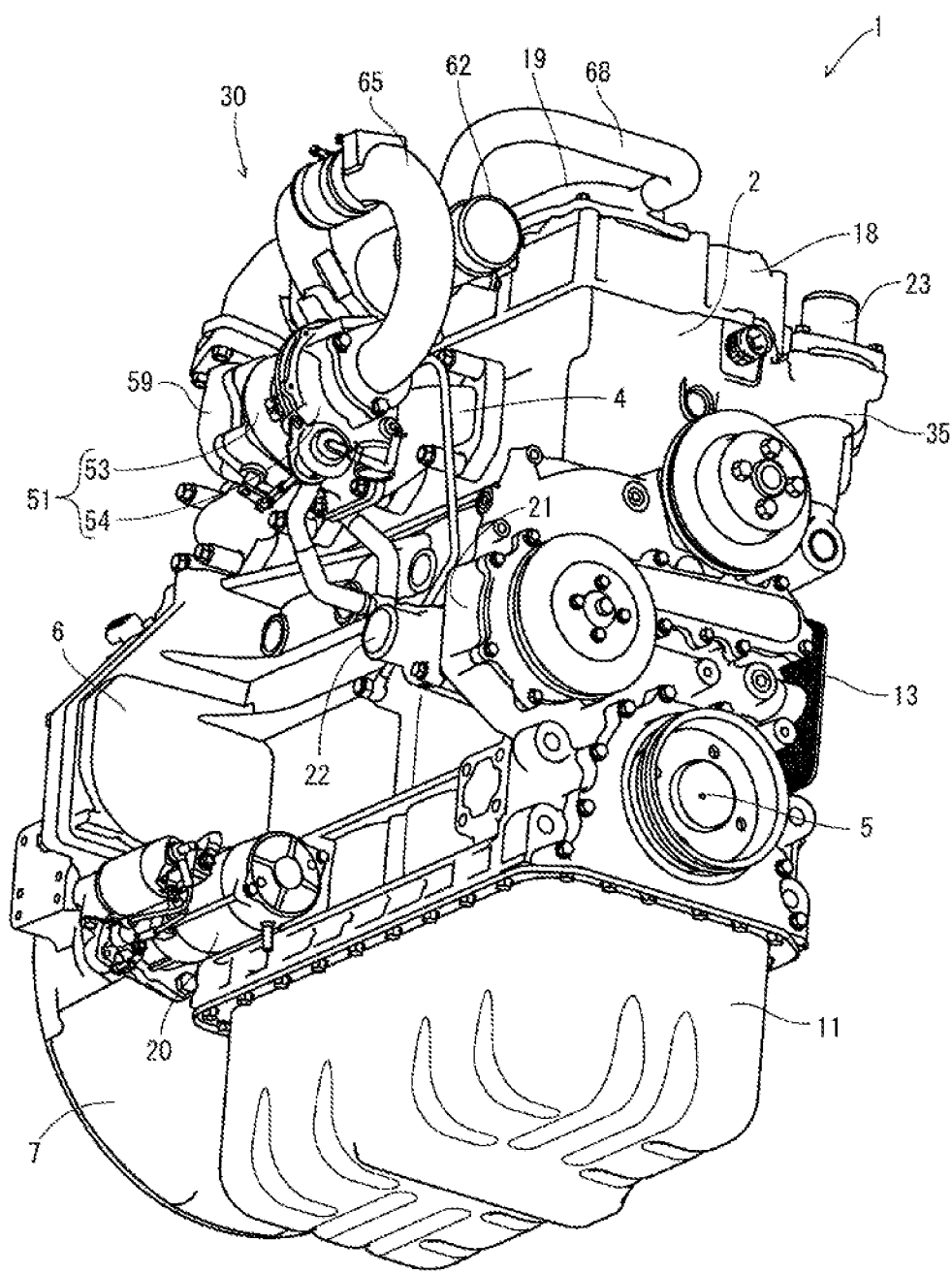
FIG. 8 A perspective view of the engine as viewed from diagonally rear.
Figure 9:
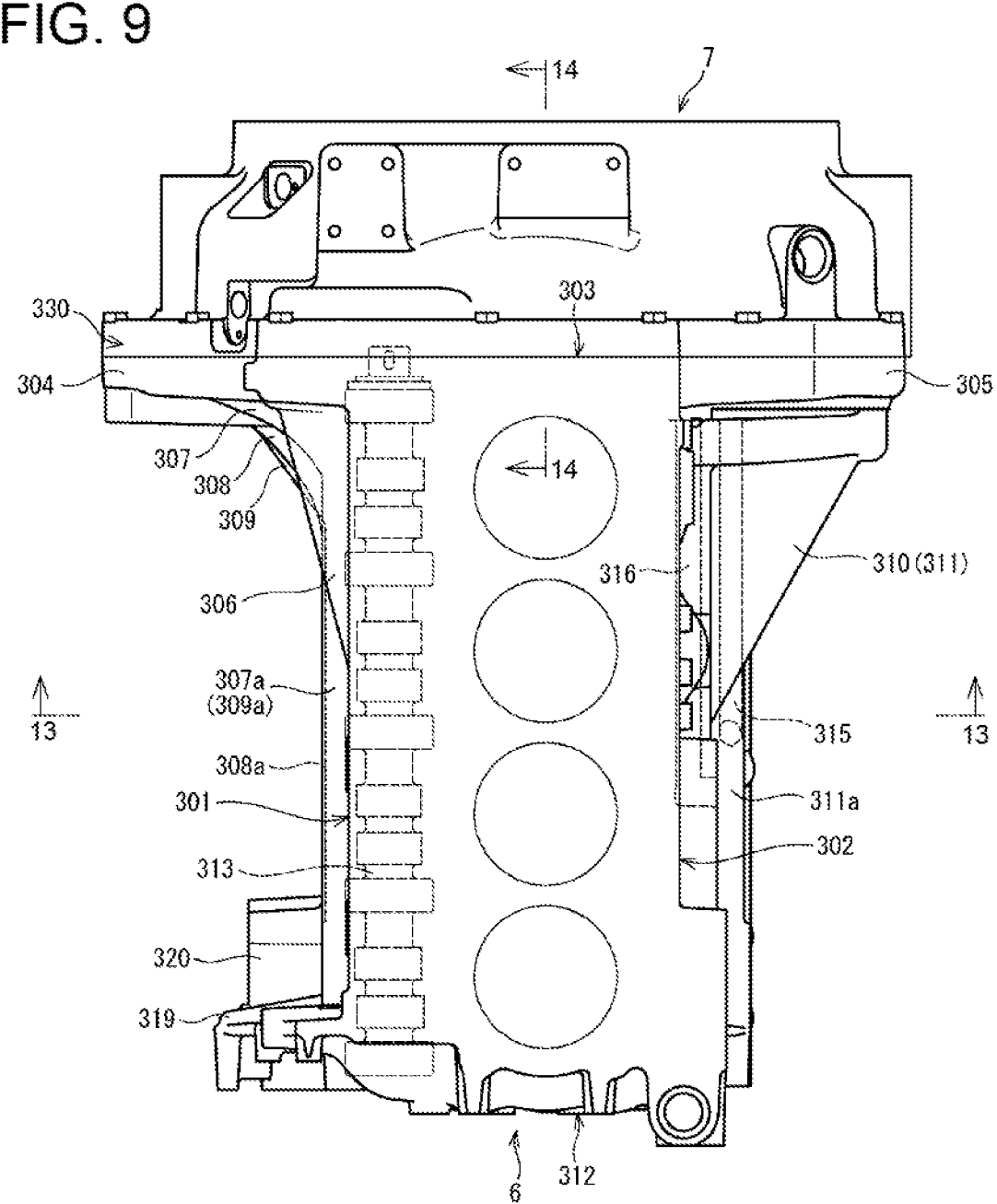
FIG. 9 A top plan view showing a cylinder block and a flywheel housing.

Each of the left surface 301 and the right surface 302 is provided with two mount attachment pedestals 317 for attachment of an engine mount which couples the engine 1 to a vehicle body. The two mount attachment pedestals 317 are arranged one behind the other with respect to the front-rear direction, and protrude at positions close to the oil pan rail. The left-side fourth reinforcing rib 309 is coupled to the two mount attachment pedestals 317 protruding from the left surface 301. The right-side second reinforcing rib 311 is coupled to the two mount attachment pedestals 317 protruding from the right surface 302. As shown in FIG. 2, a crank case covering member 326 is secured to the rear surface 312 of the cylinder block 6 with bolts. The crank case covering member 326 covers surroundings of the crankshaft 5 so as not to expose the inside of a crank case to the outside of the engine 1. The oil pan 11 is fastened to a lower surface of the crank case covering member 326 with at least one bolt.

The housing bracket portions 304, 305 and the reinforcing ribs 306 to 311 which are formed integrally with the cylinder block 6 contribute to enhancement of the rigidity of the cylinder block 6, and particularly the rigidity and strength of a portion of the cylinder block 6 near the front surface 303. Thus, vibration and noise of the engine 1 can be reduced. In addition, since the housing bracket portions 304, 305 and the reinforcing ribs 306 to 311 contribute to an increase in a surface area of the cylinder block 6, the cooling efficiency of the cylinder block 6 can be enhanced, and therefore the cooling efficiency of the engine 1 can be enhanced.

A coolant pump attaching part 319 and an inlet pipe attachment pedestal 320 are provided so as to protrude from a portion of the left surface 301 of the cylinder block 6, the portion being relatively close to the rear surface 312. To the coolant pump attaching part 319, a coolant pump 21 (see FIG. 2, etc.) is attached. To the inlet pipe attachment pedestal 320, the coolant inlet pipe 22 (see FIG. 3, etc.) is attached. A portion of the inlet pipe attachment pedestal 320 close to the rear surface 312 is coupled to the coolant pump attaching part 319. The coolant pump attaching part 319 and the inlet pipe attachment pedestal 320 protrude in a direction away from the crankshaft 5, and contributes to enhancing of the rigidity, the strength, and the cooling efficiency of the cylinder block 6.

A camshaft casing 314 (see FIG. 13) for accommodating a camshaft 313 is provided inside the cylinder block 6. Although details are omitted, a crank gear 331 fixed to the crankshaft 5 and a cam gear 332 fixed to the camshaft 313 are disposed on the front surface 303 of the cylinder block 6. The cam gear 332 and the camshaft 313 are rotated in conjunction with the crank gear 331. Driving a valve mechanism (not shown) that is associated with the camshaft 313 causes an intake valve and an exhaust valve (not shown) of the engine 1 to be opened or closed. The engine 1 of this embodiment has a so-called overhead valve system.

The camshaft casing 314 is disposed in the cylinder portion of the cylinder block 6, and is arranged at a position relatively close to the left surface 301. The camshaft 313 and the camshaft casing 314 are disposed in the direction along the crankshaft center 300. Substantially triangular portions and the linear portions 307a, 308 a of the left-side second reinforcing rib 307 and the left-side third reinforcing rib 308 provided on the left surface 301 of the cylinder block 6 are arranged close to a position where the camshaft casing 314 is disposed in a side view, and more specifically at a position overlapping the position where the camshaft casing 314 is disposed.

This embodiment, in which the rigidity of the camshaft casing 314 and therearound is enhanced by the left-side second reinforcing rib 307 and the left-side third reinforcing rib 308, can prevent distortion of the camshaft casing 314. Accordingly, a variation in the rotation resistance and the rotational friction of the camshaft 313, which may occur due to distortion of the camshaft casing 314, can be prevented, so that the camshaft 313 can be rotated appropriately to open or close the intake valve and the exhaust valve (not shown) appropriately.

Of a lubricant passage provided in the cylinder block 6, a part is disposed in the skirt portion of the cylinder block 6 and arranged at a position relatively close to the right surface 302. The part includes a lubricant sucking passage 315 and a lubricant supply passage 316. The lubricant supply passage 316 is disposed in the skirt portion of the cylinder block 6 and arranged at a position relatively close to the cylinder portion. The lubricant sucking passage 315 is arranged at a position relatively close to the oil pan rail as compared to the lubricant supply passage 316.

One end of the lubricant sucking passage 315 is opened in an oil pan rail lower surface (a surface opposed to the oil pan 11) of the cylinder block 6, and is connected to a lubricant sucking pipe (not shown) disposed in the oil pan 11. The other end of the lubricant sucking passage 315 is opened in the front surface 303 of the cylinder block 6, and is connected to a suction port of the oil pump 12 (see FIG. 11) fixed to the front surface 303. One end of the lubricant supply passage 316 is opened in the front surface 303 of the cylinder block 6 at a position different from the position where the lubricant sucking passage 315 is opened, and is connected to an ejection port of the oil pump 12. The other end of the lubricant supply passage 316 is opened in an oil cooler attachment pedestal 318 protruding from the right surface 302 of the cylinder block 6, and is connected to a suction port of the oil cooler 13 (see FIG. 4, etc.) disposed on the oil cooler attachment pedestal 318. Not only the lubricant sucking passage 315 and the lubricant supply passage 316 but also other lubricant passages are provided in the cylinder block 6.

On the right surface 302 of the cylinder block 6, the right-side first reinforcing rib 310 is arranged close to the position where the lubricant supply passage 316 is arranged in a side view. More specifically, the right-side first reinforcing rib 310 is arranged so as to overlap the position where the lubricant supply passage 316 is arranged in a side view. The right-side second reinforcing rib 311 is arranged close to the position where the lubricant sucking passage 315 is arranged in a side view. The reinforcing ribs 310, 311 and the passages 315, 316 extend in the direction along the crankshaft center 300.

In this embodiment, the cooling efficiency in the vicinity of the lubricant sucking passage 315, the oil pump 12, and the lubricant supply passage 316 can be enhanced by the right housing bracket portion 305, the right-side first reinforcing rib 310, and the right-side second reinforcing rib 111. In particular, the right-side first reinforcing rib 310 arranged at a position overlapping the lubricant supply passage 316 in a side view efficiently dissipates heat in the vicinity of the lubricant supply passage 316 to the outside. This can lower the temperature of the lubricant flowing into the oil cooler 13, and can reduce the amount of heat exchange required of the oil cooler 13.

A gear train structure of the engine 1 will now be described with reference to FIG. 10 to FIG. 15. A gear case 330 is provided in a space surrounded by the front surface 303 of the cylinder block 6, the housing bracket portions 304, 305, and the flywheel housing 7. As shown in FIG. 12 and FIG. 14, front distal end portions of the crankshaft 5 and the camshaft 313 protrude from the front surface 303 of the cylinder block 6. The crank gear 331 is secured to the front distal end portion of the crankshaft 5. The cam gear 332 is secured to the front distal end portion of the camshaft 313. A disk-shaped camshaft pulsar 339 is fastened with bolts to a surface of the cam gear 332 on the flywheel housing 7 side such that the camshaft pulsar 339 is rotatable integrally with the cam gear 332.

Figure 12:
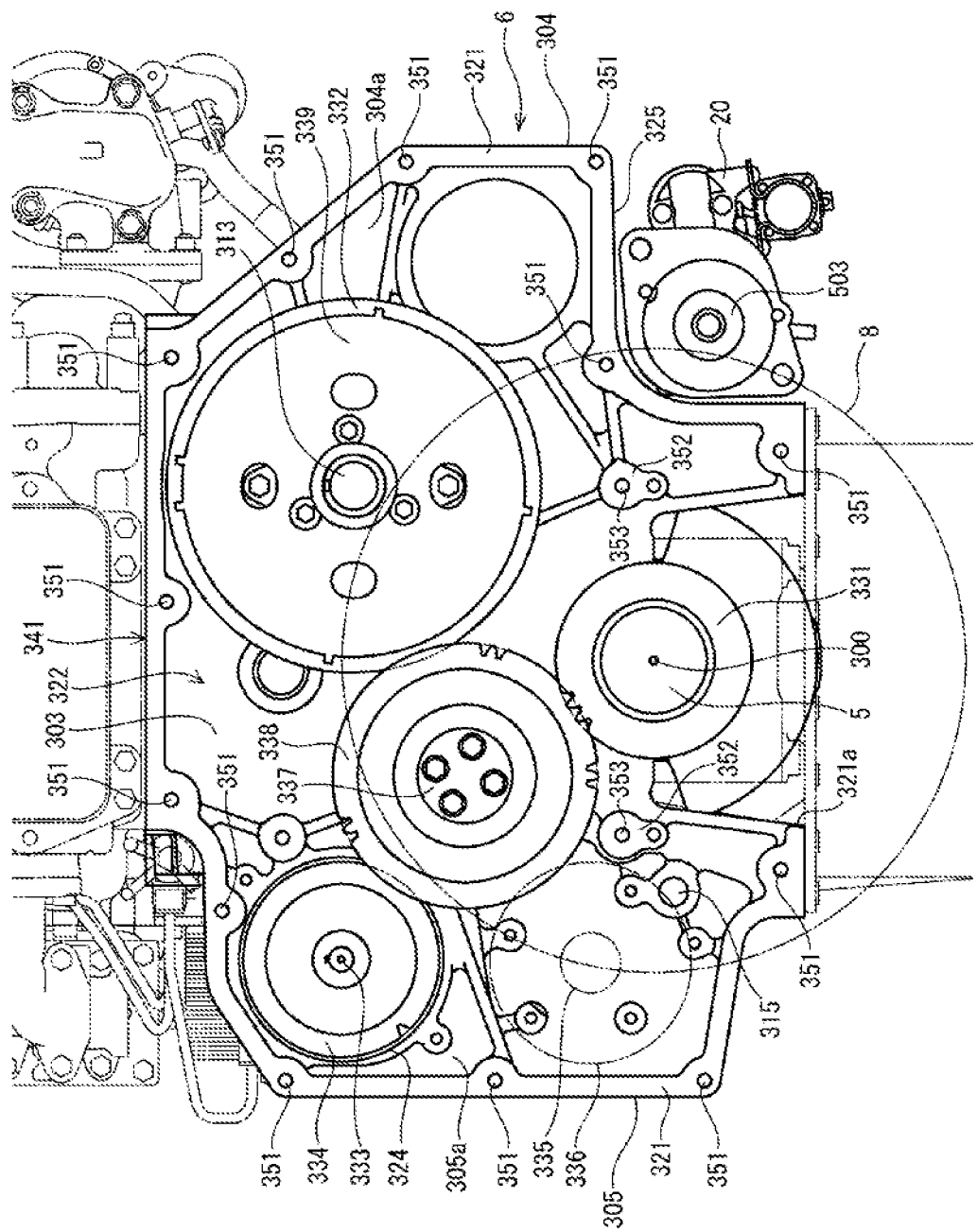
FIG. 12 A front view showing a gear train.
Figure 13:
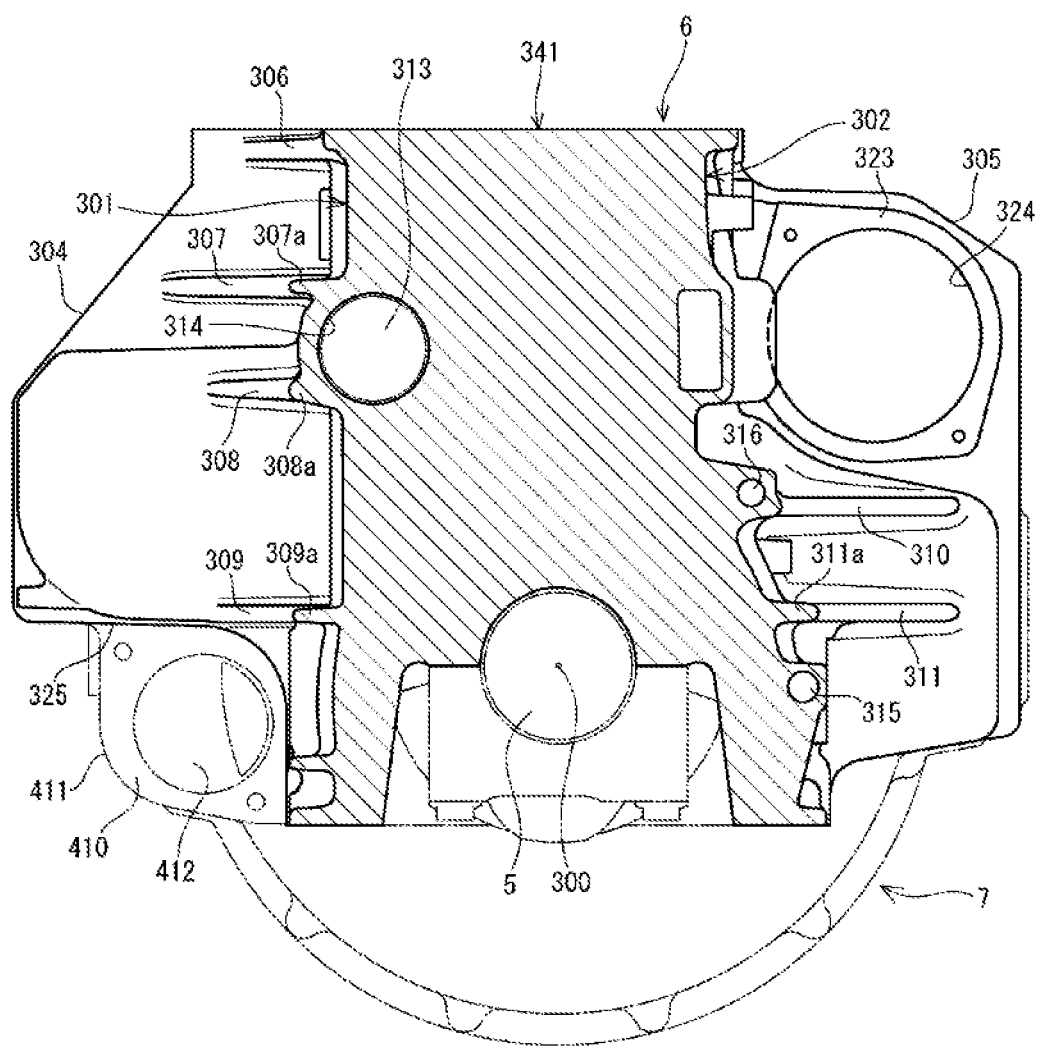
FIG. 13 A cross-sectional view taken alone the line 13-13 in FIG. 9
FIG. 14 A cross-sectional view taken along the line 14-14 in FIG. 9.
Figure 14:
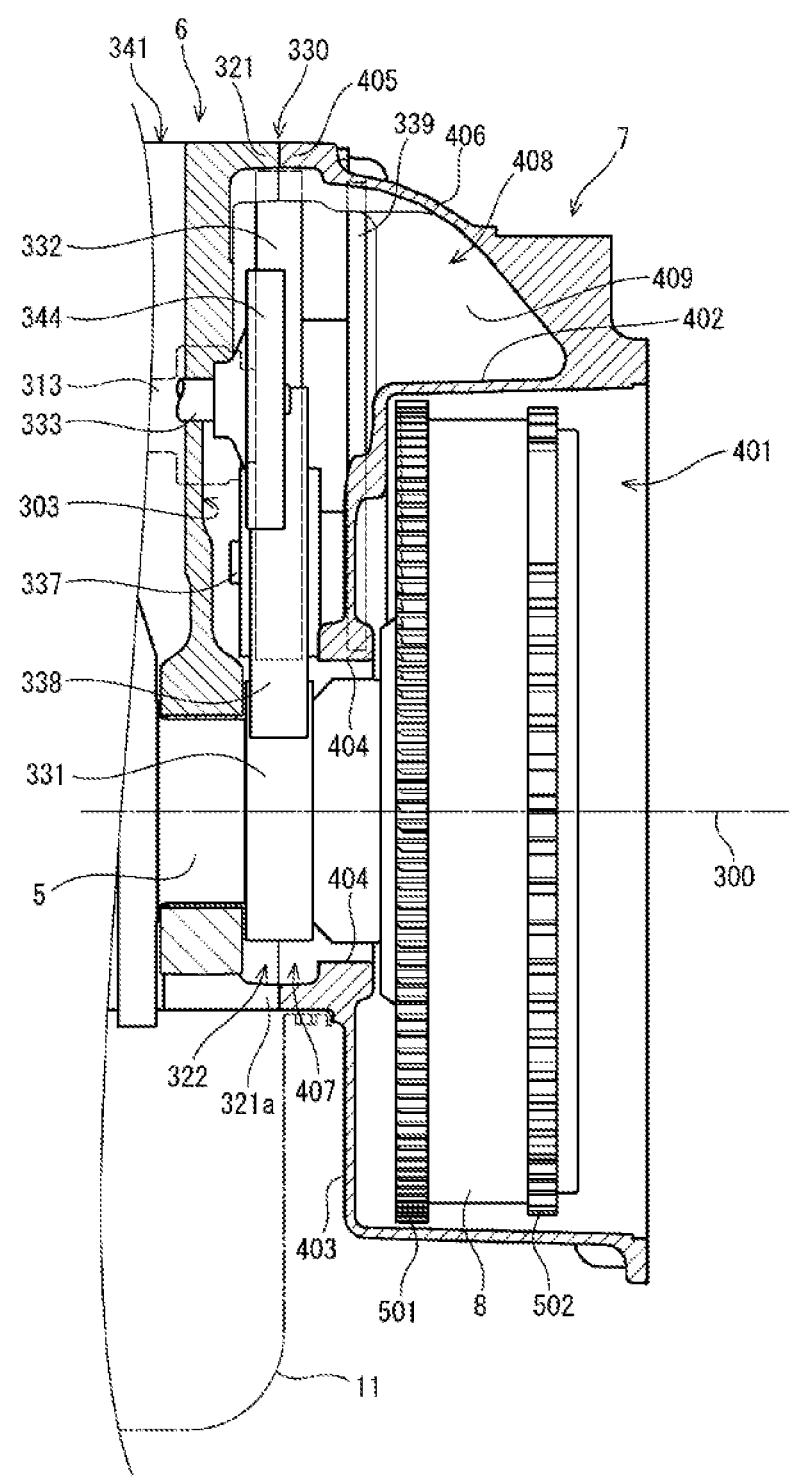
Figure 15:
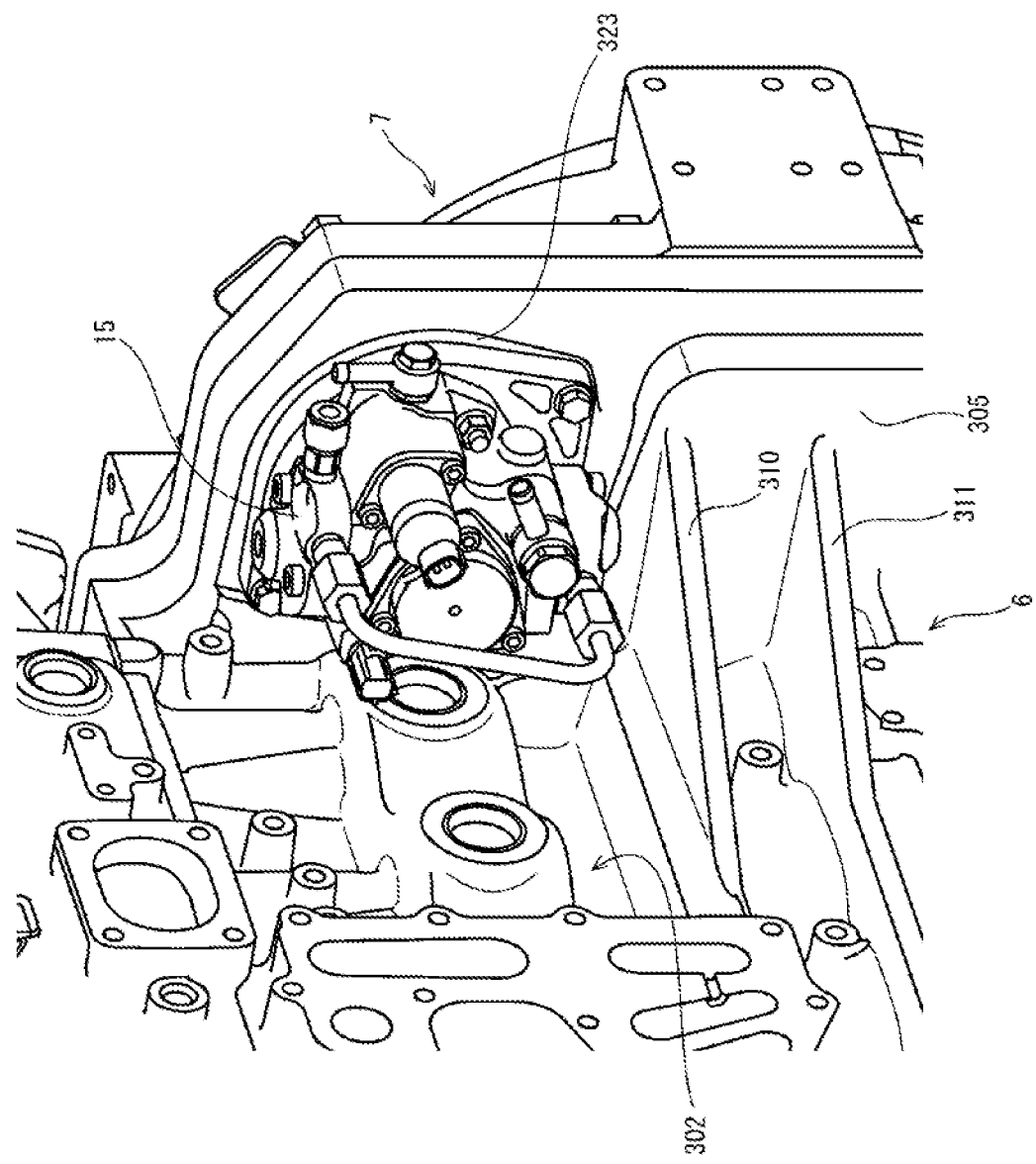
FIG. 15 A perspective view showing a position where a fuel feed pump is attached.

As shown in FIG. 12, FIG. 13, and FIG. 15, the fuel feed pump 15 provided in the right housing bracket portion 305 of the cylinder block 6 includes a fuel feed pump shaft 333 as a rotation shaft extending in parallel to the rotation axis of the crankshaft 5. The front end side of the fuel feed pump shaft 333 protrudes from a front surface 305 a of the right housing bracket portion 305. A fuel feed pump gear 334 is secured to a front distal end portion of the fuel feed pump shaft 333. As shown in FIG. 13, the right housing bracket portion 305 of the cylinder block 6 includes a fuel feed pump attachment pedestal 323 for arranging the fuel feed pump 15 above the right-side first reinforcing rib 310. A fuel feed pump gear 334 is secured to a front distal end portion of the fuel feed pump shaft 333.

Figure 11:
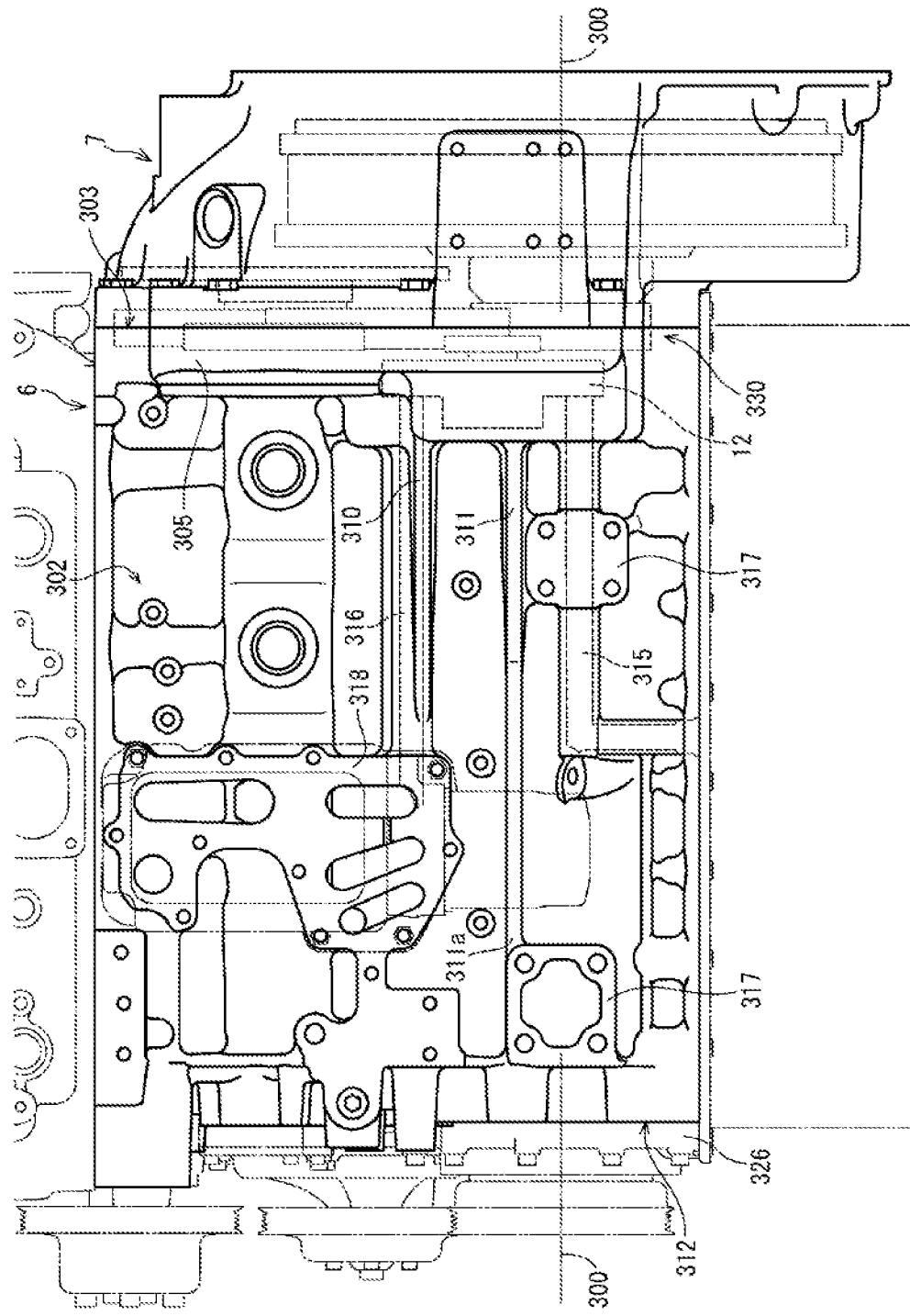
FIG. 11 A right side view showing the cylinder block and the flywheel housing.

As shown in FIG. 11 and FIG. 12, the oil pump 12, which is disposed on the front surface 305 a of the right housing bracket portion 305 and arranged below the fuel feed pump gear 334, includes an oil pump shaft 335 as a rotation shaft extending in parallel to the rotation axis of the crankshaft 5. An oil pump gear 336 is secured to a front distal end portion of the oil pump shaft 335.

On the front surface 303 of the cylinder block 6, an idle shaft 337 extending in parallel to the rotation axis of the crankshaft 5 is provided in a portion surrounded by the crankshaft 5, the camshaft 313, the fuel feed pump shaft 333, and the oil pump shaft 335. The idle shaft 337 is fixed to the front surface 303 of the cylinder block 6. An idle gear 338 is rotatably supported on the idle shaft 337.

The idle gear 338 is meshed with four gears, namely, the crank gear 331, the cam gear 332, the fuel feed pump gear 334, and the oil pump gear 336. Rotational power of the crankshaft 5 is transmitted from the crank gear 331 to the three gears of the cam gear 332, the fuel feed pump gear 334, and the oil pump gear 336, via the idle gear 338. Thus, the camshaft 313, the fuel feed pump shaft 333, and the oil pump shaft 335 are rotated in conjunction with the crankshaft 5. In the embodiment, the gear ratio among the gears 331, 332, 334, 336, 338 is set such that: two rotations of the crankshaft 5 correspond to one rotation of the camshaft 313; and one rotation of the crankshaft 5 corresponds to one rotation of the fuel feed pump shaft 333 and the oil pump shaft 335.

In this configuration, rotating the cam gear 332 and the camshaft 313 in conjunction with the crank gear 331 which rotates together with the crankshaft 5 to drive the valve mechanism (not shown) that is associated with the camshaft 313 causes the intake valve and the exhaust valve (not shown) provided in the cylinder head 2 to be opened or closed. In addition, rotating the fuel feed pump gear 334 and the fuel feed pump shaft 333 in conjunction with the crank gear 331 to drive the fuel feed pump 15 causes the fuel in the fuel tank 118 to be pressure-fed to the common rail 120 so that a high-pressure fuel is stored in the common rail 120. In addition, rotating the oil pump gear 336 and the oil pump shaft 335 in conjunction with the crank gear 331 to drive the oil pump 12 causes the lubricant in the oil pan 11 to be supplied to various sliding component parts and the like through a lubricating system circuit (details are not shown) including the lubricant sucking passage 315, the lubricant supply passage 316, the oil cooler 13, the oil filter 14, and the like. A fuel in the fuel tank 118 is pressure-fed from the fuel feed pump 15 to the common rail 16, so that a high-pressure fuel is stored in the common rail 16.

As shown in FIG. 15, the fuel feed pump 15 serving as an auxiliary machine that is operated in conjunction with rotation of the crankshaft 5 is secured with bolts to the fuel feed pump attachment pedestal 323 of the right housing bracket portion 305. The right-side first reinforcing rib 310 is arranged close to the fuel feed pump attachment pedestal 323. The right-side first reinforcing rib 310 is arranged directly under the fuel feed pump 15, and the right-side second reinforcing rib 311 is arranged directly under the right-side first reinforcing rib 310. The reinforcing ribs 310, 311 can enhance the rigidity of the fuel feed pump attachment pedestal 323, and also can prevent the fuel feed pump 15 from being contacted by a foreign object such as muddy water or stone coming from below, for protection of the fuel feed pump 15.

The gear case 330 that accommodates the gear train and the structure of the flywheel housing 7 will now be described with reference to FIG. 10 to FIG. 12, FIG. 14, and FIG. 16 to FIG. 20. As shown in FIG. 12 and FIG. 14, a block-side projecting portion 321 that extends along a peripheral edge of a region including the front surfaces 303, 304 a, 305 a of the cylinder block 6 and of the left and right housing bracket portions 304, 305 is provided upright on a peripheral edge portion of the front surfaces 303, 304 a, 305 a. The block-side projecting portion 321 is joined with the flywheel housing 7. The block-side projecting portion 321 is joined with the flywheel housing 7. The block-side projecting portion 321 has a cutout portion 321a at a location between the left and right oil pan rails of the cylinder block 6. A space between an end surface of the block-side projecting portion 321 and the front surfaces 303, 304 a, 305 a in a side view defines a block-side gear casing 322.

As shown in FIG. 14 and FIG. 16 to FIG. 20, the flywheel housing 7 which is made of, for example, cast iron includes a flywheel accommodating part 401 that accommodates the flywheel 8. The flywheel accommodating part 401 has a bottomed cylindrical shape formed by a circumferential wall surface portion 402 and a rear wall surface portion 403 being coupled to each other. The circumferential wall surface portion 402 has a substantially cylindrical shape and covers the outer circumferential side of the flywheel 8. The rear wall surface portion 403 covers a rear surface side (a surface on the cylinder block 6 side) of the flywheel 8. The flywheel 8 is accommodated in a space surrounded by the circumferential wall surface portion 402 and the rear wall surface portion 403. The circumferential wall surface portion 402 is in the shape of a substantially truncated cone with its radius decreasing toward the rear wall surface portion 403. The rear wall surface portion 403 has, in its central portion, a crankshaft insertion hole 404 through which the crankshaft 5 is inserted.

A flange-side projecting portion 405 having an annular shape that corresponds to the shape of the block-side projecting portion 321 of the cylinder block 6 is coupled to the rear wall surface portion 403 so as to surround a position where the crankshaft insertion hole 404 is disposed. The center of the flange-side projecting portion 405 is deviated upward from the crankshaft insertion hole 404. A lower portion of the flange-side projecting portion 405, which extends in the left-right direction (lateral direction), is close to the crankshaft insertion hole 404 and is coupled to the rear wall surface portion 403.

Upper, left, and right portions of the flange-side projecting portion 405 are located outside the rear wall surface portion 403. A front portion of the circumferential wall surface portion 402 and a front portion of the flange-side projecting portion 405 located outside the rear wall surface portion 403 are coupled to each other in an outer wall portion 406. The outer wall portion 406 has a curved slope shape convexing in a direction away from the crankshaft 5. In the flywheel housing 7, a lower portion of the flywheel accommodating part 401 protrudes from the flange-side projecting portion 405 in a direction away from the crankshaft 5.

A space between the rear wall surface portion 403 and an end surface of the flange-side projecting portion 405 in a side view defines a housing-side gear casing 407. This flange-side gear casing 407 and the above-mentioned block-side gear casing 322 constitute the gear case 330. With the engine 1 of this embodiment, the flywheel 8 and the gear train can be arranged on the same end portion of the crankshaft 5. Twist of the crankshaft 5 can be reduced by solving the twist of crankshaft 5 caused by the structure having the flywheel 8 and the gear train arranged across from each other over the cylinder block 6. Further, regarding torsion vibration of the crankshaft 5 which causes vibration and noise of the gear train, the torsion vibration of the crankshaft 5 to be transmitted to the gear train is reduced by arranging the flywheel 8 and the gear train having a large moment of inertia, on the same end portion of the crankshaft 5. This way, vibration and noise of the gear train can be reduced. Further, the number of parts can be reduced as compared to a case of using a separate part for the gear case. Hence, reduction of the manufacturing costs and assembling processes can be achieved.

Further, the gear case 330 is structured by the cylinder block 6 and the flywheel housing 7 of cast iron, for example. The left and right housing bracket portions 304, 305 structuring the gear case 330 and the reinforcing ribs 306 to 311 reinforcing these members are integrally formed with the cylinder block 6. Therefore, the rigidity is improved as compared to a traditional gear case made of aluminum die-cast, and vibration and noise of the gear train are reduced. Further, the noise generated from the cylinder block 6 and the gear train can be attenuated by the weight-reduction space 408 continuous with the gear case 330, and the outer wall portion 406 is formed in a curved inclined shape, so that the radiation area is reduced as compared with the rectangular parallelepiped shape. Therefore, the noise emitted to the outside of the engine can be reduced.

Inside the flywheel housing 7, a weight-reduction space 408 is formed between an outer wall of the circumferential wall surface portion 402 of the flywheel accommodating part 401 and an inner wall of the outer wall portion 406. A plurality of housing ribs 409 (ribs) configured to couple the circumferential wall surface portion 402 to the outer wall portion 406 are disposed in the weight-reduction space 408. In this way, while the weight of the flywheel housing 7 is reduced by the weight-reduction space 408, the housing ribs 409 achieve the strength. Thus, problems such as an increase in weight, manufacturing defects during casting, cracks due to concentration of stress taking place when the thickness of a wall is increased to achieve the strength of the flywheel housing can be avoided.

Figure 18:
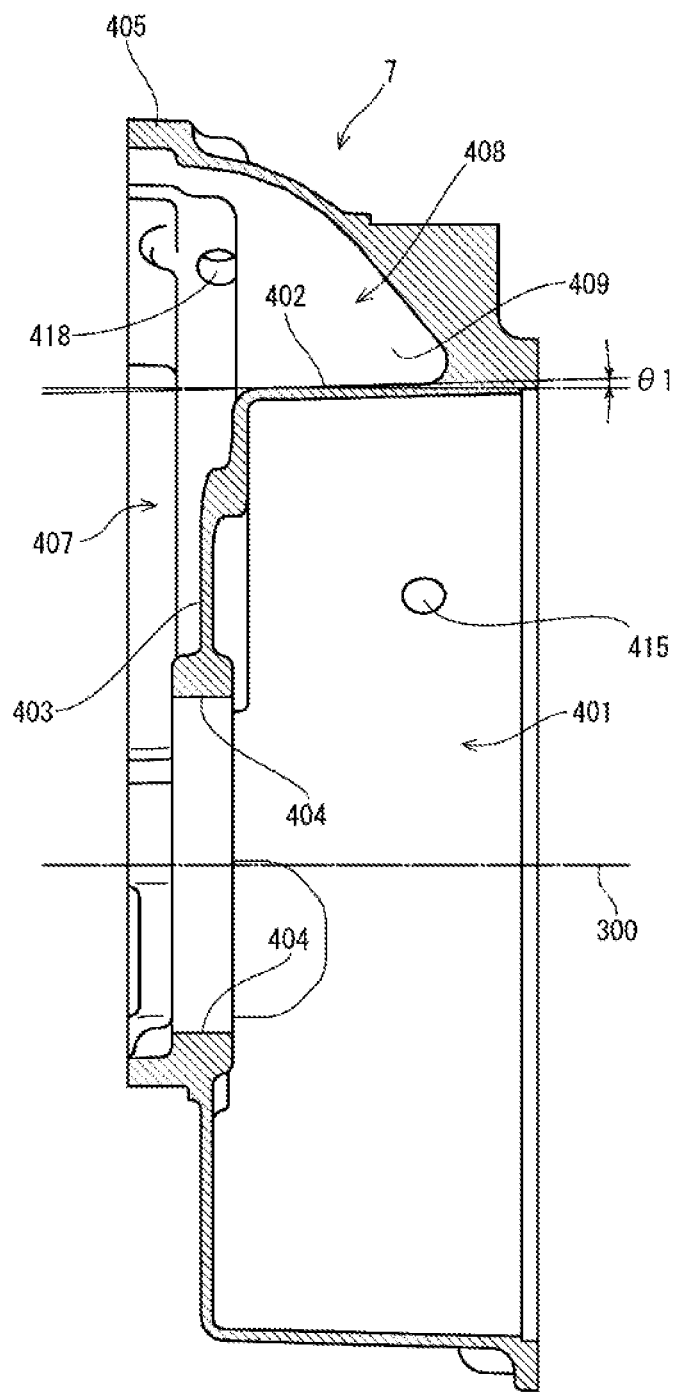
FIG. 18 A cross-sectional view taken along the line 18-18 in FIG. 16.
Figure 19:
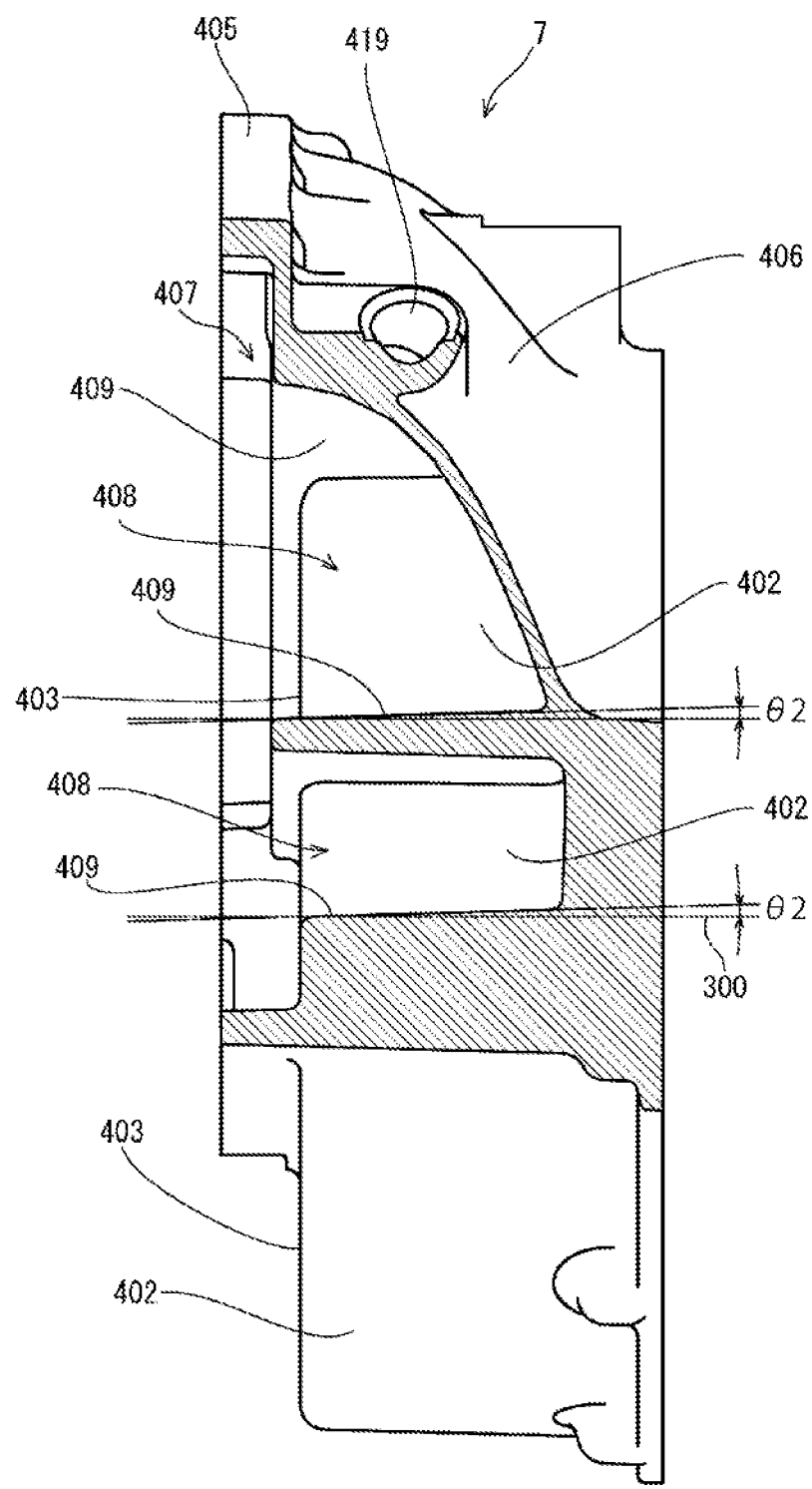
FIG. 19 A cross-sectional view taken along the line 19-19 in FIG. 16.
Figure 20:
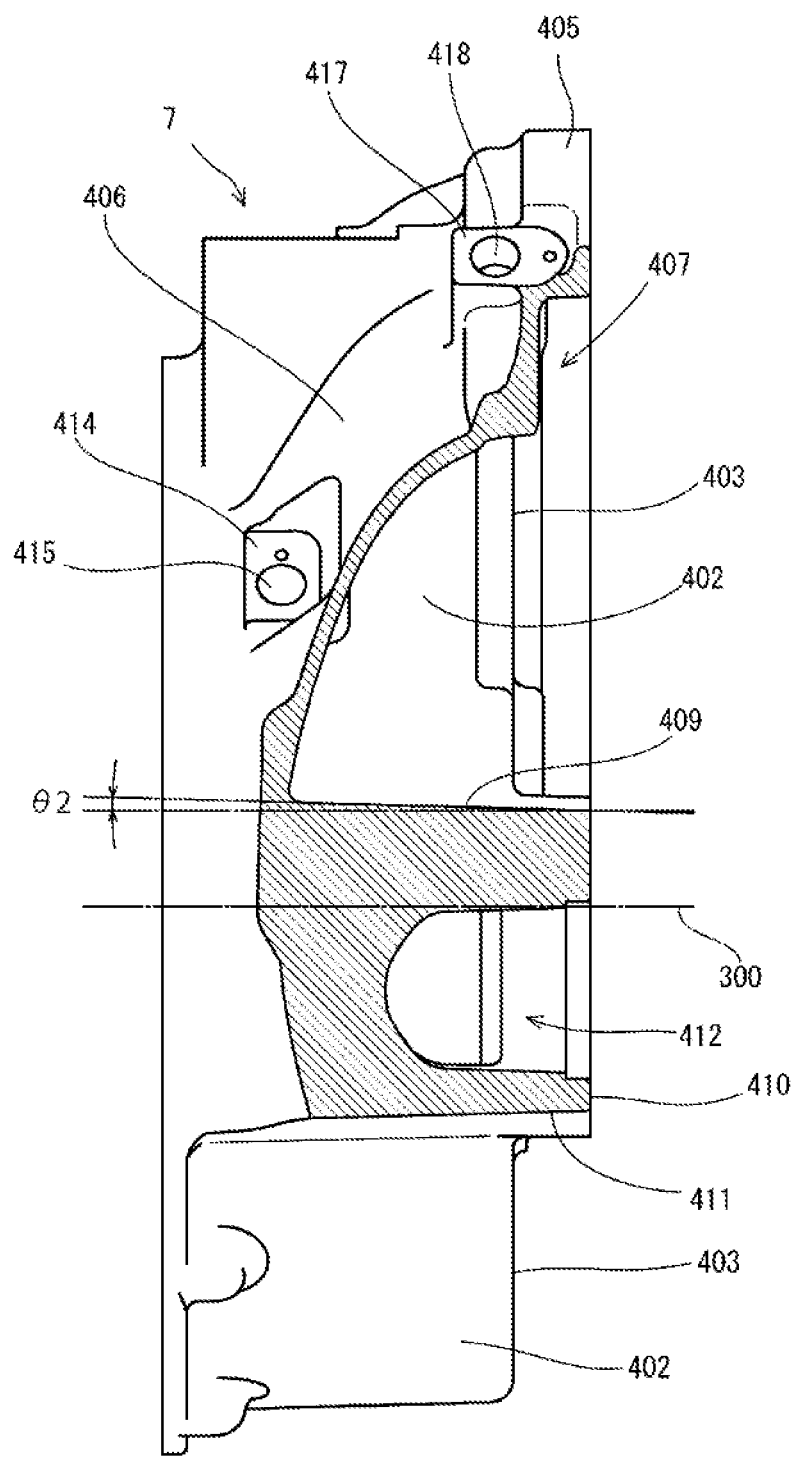
FIG. 20 A cross-sectional view taken along the line 20-20 in FIG. 16
FIG. 21 A left side view showing the flywheel housing and a rotation angle sensor.
Figure 21:
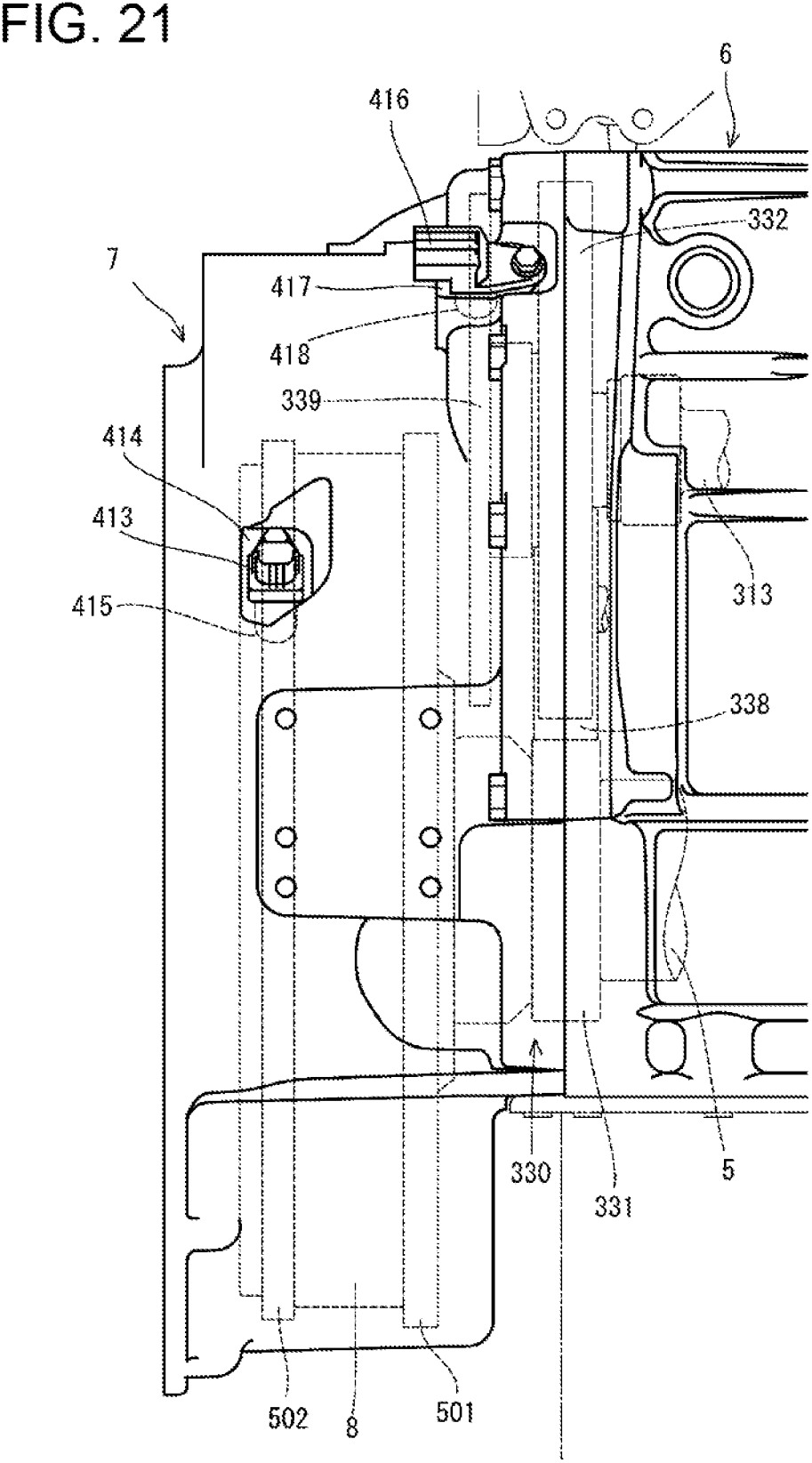

As shown in FIG. 18, by forming the circumferential wall surface portion 402 in a shape of a substantially truncated cone with its radius decreasing towards the cylinder block 6. This way, the circumferential wall surface portion 402 exposed to the weight-reduction space 408 has a slope that is inclined by an angle θ1 so that its side of the cylinder block 6 is lowered relative to the crankshaft center 300. Further, as shown in FIG. 19 and FIG. 20, a surface of each housing rib 409 on the side of the block upper surface 341 (cylinder head coupling surface) of the cylinder block 6 has a slop inclined by an angle of θ2 so as to be in a position closer to the side of the block upper surface 341 (see FIG. 12) with an increase in the distance from the cylinder block 6. This way, accumulation of lubricating oil in the flywheel housing 7 is prevented, and an accurate amount of lubricating oil in the engine 1 can be observed. It should be noted that the angles θ1 and θ2 may be the same or may be different from each other. Further, the angles θ2 of the plurality of housing ribs 409 may be the same or may be different from one another.

As shown in FIG. 15, FIG. 16, and FIG. 20 to FIG. 21, the flywheel housing 7 has a sensor attachment seating 414 for a crankshaft rotation angle sensor 413 (crankshaft rotation angle detecting member) configured to detect a rotation angle of the crankshaft 5. The sensor attachment seating 414 has a through hole 415 to which the crankshaft rotation angle sensor 413 is inserted. An annular crankshaft pulsar 502 (see FIG. 14) are fixed to the outer circumferential side of the flywheel 8. On the outer peripheral surface of the crankshaft pulsar 502, output protrusions are formed as detectable portions arranged at predetermined crank angles (rotation angles). On the outer peripheral surface of the crankshaft pulsar 502, for example, a tooth-chipped part is formed at a portion corresponding to the top dead center (TDC) of the first or fourth cylinder. The crankshaft rotational angle sensor 413 is detachably mounted on the sensor mounting seat 414 and is arranged close to the outer circumferential side of the crankshaft pulsar 502 so as to face the crankshaft pulsar 502. The crankshaft rotation angle sensor 413 is for detecting the crank angle (rotation angle) of the crankshaft 5, and each of the output protrusions of the crankshaft pulsar 502 passes its vicinity with rotation of the crankshaft 5, thereby outputting a crank angle signal.

Further, the flywheel housing 7 has a sensor attachment seating 417 for a camshaft rotation angle sensor 416 (drive gear rotation angle detecting member) configured to detect a rotation angle of the cam gear 332. The sensor attachment seating 417 has a through hole 418 to which the camshaft rotation angle sensor 416 is inserted. The camshaft rotation angle sensor 416 is detachably mounted on the sensor mounting seat 417 and is arranged close to the outer circumferential side of the camshaft pulsar 339 so as to face the camshaft pulsar 339 bolt-fastened to the cam gear 332. On the outer peripheral surface of the camshaft pulsar 339, output protrusions are formed as detectable portions arranged at every 90 degrees (every 180 degree crank angle). Extra tooth is formed immediately before each of the output protrusions (on the upstream side of the rotation) corresponding to, for example, the top dead center of the first cylinder on the circumferential surface of the camshaft pulsar 339. The camshaft rotation angle sensor 416 is for detecting the rotation angle of the camshaft 313 (which may be referred to as a cam gear 332) of the camshaft, and each of the output protrusions and the extra tooth of the camshaft pulsar 339 passes its vicinity with rotation of the camshaft 313, thereby outputting a rotation angle signal.

A crank angle signal output from the crankshaft rotation angle sensor 413 with the rotation of the crankshaft 5 and a rotation angle signal output from the camshaft rotation angle sensor 416 with the rotation of the camshaft 313 are transmitted to a controller (not shown). The controller discriminates the cylinder and calculates the crank angle from these signals, and electronically controls each fuel injection valve (not shown) (controls fuel injection and ignition for each cylinder) based on the calculation result. An injection pressure, an injection timing, and an injection period (injection amount) of the fuel supplied from each injector (not shown) can be controlled with a high accuracy.

In this embodiment, the flywheel housing 7 structured as a single part has the sensor attachment seating 414 for the crankshaft rotation angle sensor 413 configured to detect the rotation angle of the crankshaft 5 and the sensor attachment seating 417 for the camshaft rotation angle sensor 416 configured to detect the rotation angle of the camshaft 313 (cam gear 332). With this, an attachment error caused by unevenness in the manufacturing accuracy and the assembling accuracy, which takes place at a time of attaching the two rotation angle sensors 413, 416 to separate parts as in a traditional art, can be eliminated. By eliminating the error, discrimination of the cylinder and phase calculation of the rotation angle of the crankshaft 5 can be accurately performed. Hence, the exhaust gas performance and the like can be prevented from being deteriorated. Further, by mounting two rotation angle sensors 413, 416 to the flywheel housing 7 which is a single part, the distance between the rotation angle sensors 413, 416 is shortened as compared with a traditional art in which these rotation angle sensors 413 and 416 are disposed with the cylinder block 6 interposed therebetween. Therefore, arrangement of harnesses connected to the rotation angle sensors 413, 416 can be simplified. Further, by standardizing the shape of the sensor mounting seats 414, 417, the costs of attaching parts for the rotation angle sensors 413, 416 to the sensor mounting seats 414, 417 can be reduced.

A pump shaft pulsar may be mounted to the fuel feed pump gear 334, instead of the camshaft pulsar 339 and the camshaft rotation angle sensor 416. Further, the drive gear rotation angle detecting member configured to detect the rotation angle of the fuel feed pump shaft 333 (fuel feed pump gear 334) may be mounted to the flywheel housing 7. A structure of discriminating cylinder by using a pump shaft pulsar is disclosed in PTL 2, for example.

As shown in FIG. 16, FIG. 17, FIG. 19, and FIG. 22, a portion where the lubricating oil supply port 419 is formed projects from the upper right portion of the outer wall portion 406 of the flywheel housing 7. The lubricant oil supply port 419 has a substantially cylindrical through hole penetrating the outer wall portion 406. The opening on the external side of the lubricating oil supply port 419 is formed along a plane roughly perpendicular to the central axis in a substantially cylindrical shape. An opening on the internal side of the lubricant oil filler port 419 is formed along the inner wall of the outer wall portion 406 having a convex curved inclined shape in a direction away from the crankshaft 5. Thus, the lubricating oil supply port 419 is such that the opening area of the internal side is greater than the opening area of the external side.

Figure 22:
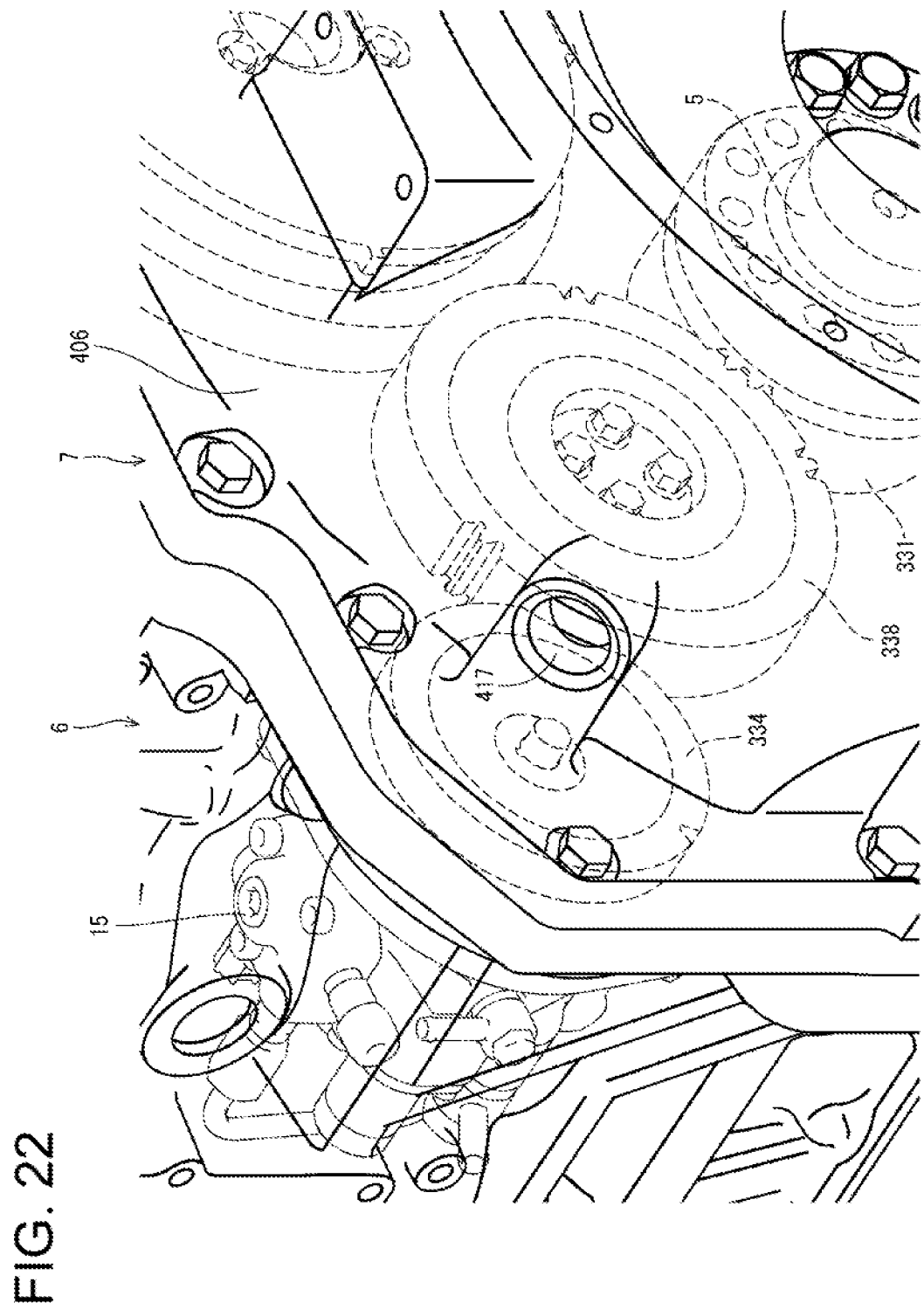
FIG. 22 A perspective view showing a lubricating oil supply port, enlarged.

As shown in FIG. 22, the lubricating oil supply port 419 is configured so that a meshing position of the fuel feed pump gear 334 and the idling gear 338 is visually observable from outside. Therefore, the timing marks on the fuel feed pump gear 334 and the idling gear 338 to be adjusted with the phase of the crankshaft 5 can be observed through the lubricating oil supply port 419. With this, the fuel feed pump 15 can be replaced, adjusting the timing marks, without detaching the flywheel 8 and the flywheel housing 7 which are very heavy parts. The number of parts to be replaced and the number of processes for attaching and detaching the engine 1 can be reduced, and the service performance can be significantly improved. Further, since the flywheel 8 which is a rotating member does not have to be detached, the product safety after the maintenance can be improved. Further, since an audit window exclusively for mark adjustment does not have to be provided in the flywheel housing 7, an opening portion area of the flywheel housing 7 including the gear case 330 can be reduced. Therefore, gear noise leaking to the outside the engine 1 can be suppressed.

Further, the lubricating oil supply port 419 is such that an opening area of an internal side of the flywheel housing is greater than an opening area of an external side of the flywheel housing 7. Therefore, the field of view for visually observing the inside of the gear case through the lubricating oil supply port 419 can be broadened, thus improving the convenience in the work of adjusting the mark at the time of replacing the fuel feed pump 15. Further, with the opening area of the internal side being greater than the opening area of the external side, spilling of lubricating oil at a time of supplying the lubricating oil through the lubricating oil supply port 419 can be prevented. The shape of the lubricating oil supply port 419 is not limited to a cylindrical shape, and may be, for example, an inverted tapered shape which broadens towards the internal side of the flywheel housing 7.

In addition, the lubricant oil filler port 419 is opened so as to penetrate towards a portion sandwiched between the two housing ribs 409, through a portion of the peripheral wall surface portion 402 exposed in the weight-reduction space 408. As a result, the lubricating oil supplied from the lubricating oil supply port 419 is supplied to the portion of the peripheral wall surface portion 402 intersecting the horizontal surface, and the lubricating oil does not spill over the other parts such as the camshaft rotation angle sensor 416.

Figure 16:
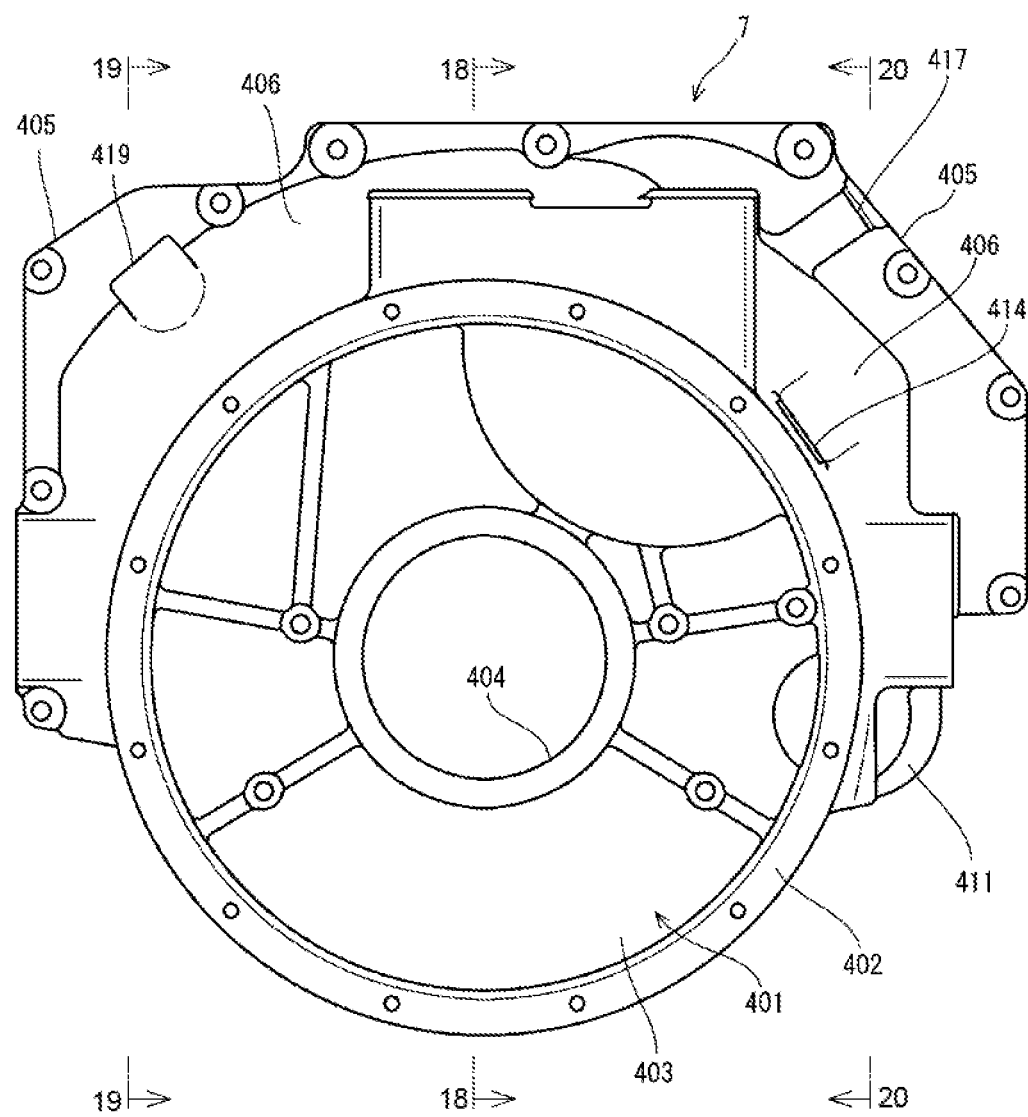
FIG. 16 A plan view showing the flywheel housing.
Figure 17:
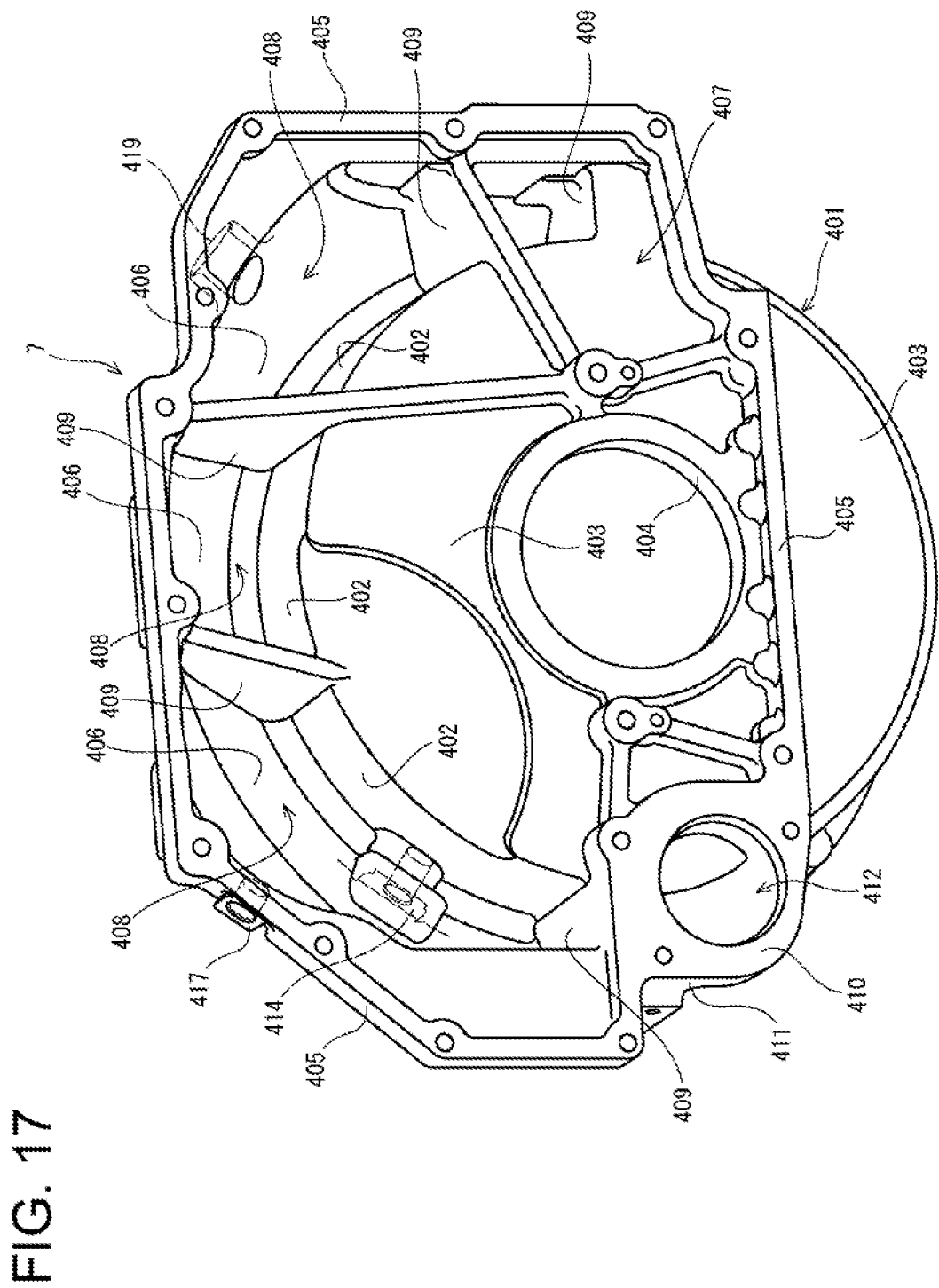
FIG. 17 A perspective view showing the inside of the flywheel housing.

As shown in FIG. 16 and FIG. 17, the flywheel 7 has a starter attaching part 411 having a starter attachment pedestal 410 that is flush with the flange-side projecting portion 405. The starter attachment pedestal 410 is coupled to the circumferential wall surface portion 402 and the flange-side projecting portion 405 at a location outside the housing-side projecting portion 405. The starter attaching part 411 has a through hole 412 bored from the starter attachment pedestal 410 to the inner wall of the circumferential wall surface portion 402. The flywheel housing 7 is fastened to the front surface 303 side of the cylinder block 6 with bolts in thirteen bolt holes 351 (see FIG. 12) of the block-side projecting portion 321 of the cylinder block 6 and in bolt holes 353 (see FIG. 12) of two housing bolting boss portions 352 of the front surface 303.

Figure 10:
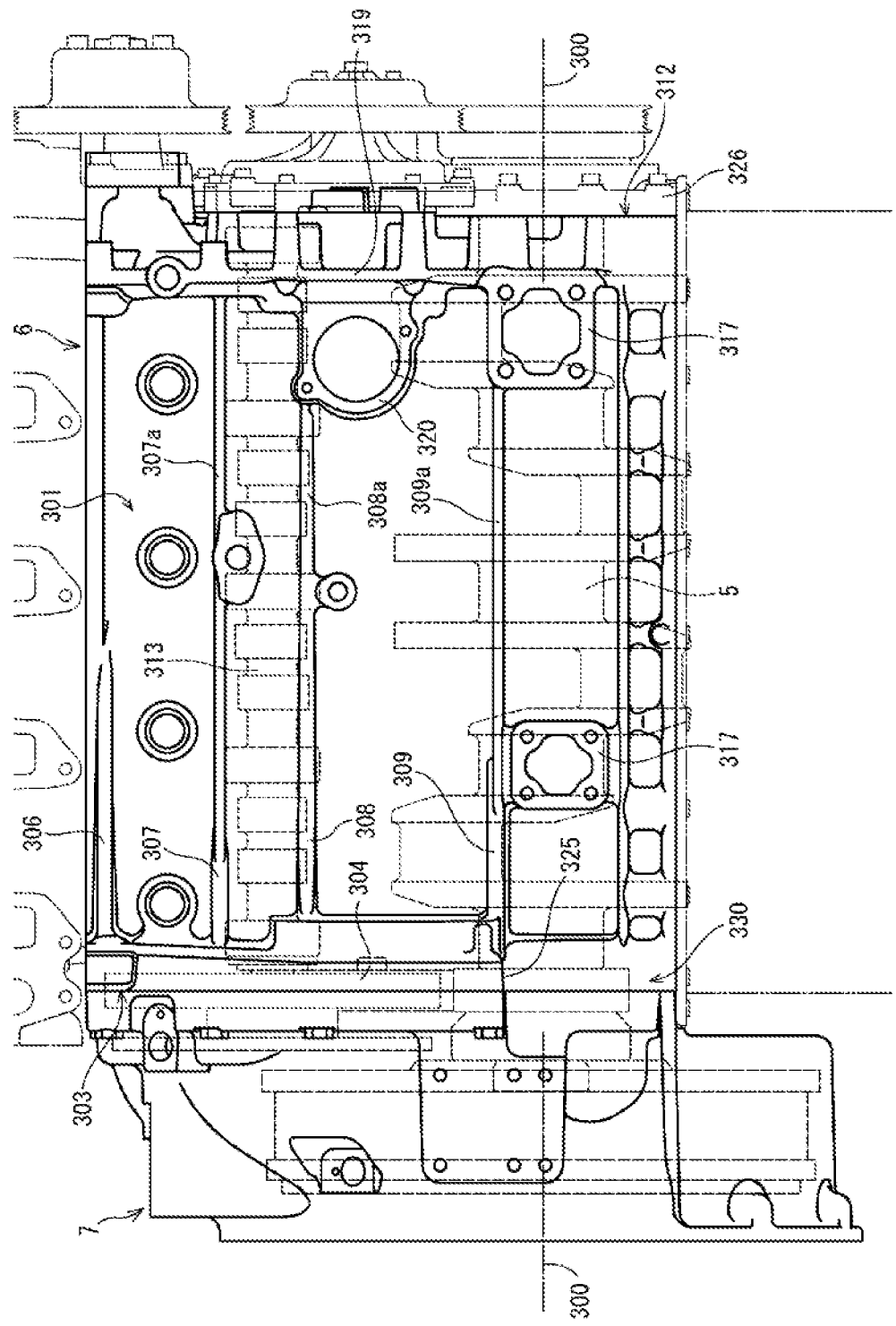
FIG. 10 A left side view showing the cylinder block and the flywheel housing.

As shown in FIG. 10, FIG. 12, and FIG. 13, the left housing bracket portion 304 of the cylinder block 6 has its peripheral edge portion recessed toward a peripheral edge portion of the flywheel housing 7, to form a bracket recessed portion 325 having a recessed shape. While the flywheel housing 7 is fixed to the cylinder block 6, the starter 20 is disposed to the starter attachment pedestal 410 of the flywheel housing 7 which is exposed on the lower side of the bracket recessed portion 325. As shown in FIG. 14, an annular ring gear 501 for the starter 20 and a crankshaft pulsar 502 are fixed to the outer circumferential side of the flywheel 8. The ring gear 501 and the crankshaft pulsar 502 are fitted in from opposite sides in a thickness direction of the flywheel 8. The starter 20 includes a pinion gear 503 (see FIG. 12) that is disposed in the through hole 412 and is separatably meshed with the ring gear 501.

In the vicinity of the starter attachment pedestal 410, the flywheel housing 7 made of cast iron is fastened with bolts to the block-side projecting portion 321 (see FIG. 12 and FIG. 14) that is provided upright on the peripheral edge portion of the front surface 304 a of the left housing bracket portion 304. In the cylinder block 6, the left-side fourth reinforcing rib 309 that couples the left housing bracket portion 304 to the left surface 301 is disposed near the bracket recessed portion 325 of the left housing bracket portion 304 which is provided near the starter attachment pedestal 410. Thereby, the rigidity of the starter attachment pedestal 410 and therearound is enhanced. In addition, the bracket recessed portion 325 of the left housing bracket portion 304 and a portion of the block-side projecting portion 321 (see FIG. 12) provided on the front surface 303 and near the starter attachment pedestal 410 so as to be continuous with the bracket recessed portion 325 also enhance the rigidity of the starter attachment pedestal 410 and therearound.

In this embodiment, the starter 20 can be attached to a portion given a high rigidity by the left-side fourth reinforcing rib 309 and the like. Thus, mispositioning and deformation of the starter 20 can be prevented, which may otherwise be caused by distortion of the starter attachment pedestal 410 or the left housing bracket portion 304. Accordingly, breakdown of the starter 20 and poor meshing between the pinion gear of the starter 20 and the ring gear 501 of the flywheel 8 can be prevented.

The configurations of respective parts of the present invention are not limited to those of the illustrated embodiment, but can be variously changed without departing from the gist of the invention.

REFERENCE SIGNS LIST 1 engine
5 crankshaft
6 cylinder block 7 flywheel housing
8 flywheel
9 fuel feed pump
300 crankshaft axial direction
301 left surface (opposite side portions)
302 right surface (opposite side portions)
303 front surface (one side surface)
304 left housing bracket portion
305 right housing bracket portion
313 camshaft
330 gear case
331 crank gear
332 cam gear
333 fuel pump shaft (pump shaft)
334 pump gear
338 idling gear
341 block upper surface (cylinder head joining surface)
402 circumferential wall surface portion
406 outer wall portion
408 weight-reduction space
409 housing rib (rib)
413 crankshaft rotation angle sensor (crankshaft rotation angle detecting member)
414 sensor attachment seating (attachment part)
416 camshaft rotation angle sensor (rotation shaft rotation angle detecting member)
414 sensor attachment seating (attachment part)
419 lubricating oil supply port

The invention claimed is:

1. An engine device comprising:
   a flywheel housing in which a flywheel that rotates integrally with a crankshaft is accommodated on one side portion of a cylinder block;
   housing bracket portions each protruding in a direction away from the crankshaft from each of opposite side portions of the cylinder block extending along a crankshaft axial direction; and
   a gear case formed by the one side portion, the housing bracket portions, and the flywheel housing, wherein the gear case accommodates a gear train.

2. The engine device according to claim 1, wherein in the flywheel housing, a weight-reduction space continuous with the gear case is formed between a cylindrical circumferential wall surface portion that covers an outer circumferential side of the flywheel and an outer wall portion that covers the outer circumferential side of the circumferential wall surface portion, and a rib portion connecting the circumferential wall surface portion and the outer wall portion is formed.

3. The engine device according to claim 2, wherein the circumferential wall surface portion is formed in a substantially conical truncated shape in which the radius becomes smaller toward the cylinder block side, and a surface of the rib on a side of a cylinder head coupling surface of the cylinder block is formed to incline so as to be in a position closer to the cylinder head coupling surface with an increase in the distance from the cylinder block.

4. The engine device according to claim 1, wherein the gear train includes a crank gear fixed to the crankshaft, an idle gear that meshes with the crank gear, a cam gear that is fixed to a camshaft and meshes with the idle gear, and a pump gear that is fixed to a pump shaft of a fuel feed pump and meshes with the idle gear; and wherein the flywheel housing is formed to have an attachment part for a crank rotation angle detection member that detects a rotation angle of the crankshaft and an attachment part for a rotation shaft rotation angle detection member that detects a rotation angle of the cam gear or the pump gear.

5. The engine device according to claim 4, wherein a lubricating oil supply port penetratingly opened in the flywheel housing is configured so that a meshing position of the fuel feed pump gear and the idle gear is visually observable.

6. The engine device according to claim 5, wherein the lubricating oil supply port has an opening area of an inner side of the flywheel housing larger than an opening area of an externa side.

* * * * *